(12) United States Patent
Durieux et al.

(10) Patent No.: US 12,510,199 B2
(45) Date of Patent: *Dec. 30, 2025

(54) CONNECTOR ELEMENT

(71) Applicant: STAUBLI FAVERGES, Faverges-Seythenext (FR)

(72) Inventors: Christophe Durieux, Gilly sur Isere (FR); Serafim Marques Barroca, Albertville (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 166 days.

This patent is subject to a terminal disclaimer.

(21) Appl. No.: 18/233,027

(22) Filed: Aug. 11, 2023

(65) Prior Publication Data
US 2023/0383883 A1 Nov. 30, 2023

Related U.S. Application Data

(62) Division of application No. 17/590,212, filed on Feb. 1, 2022, now Pat. No. 11,815,213.

(30) Foreign Application Priority Data

Feb. 5, 2021 (FR) ..................................... 2101122

(51) Int. Cl.
*F16L 37/46* (2006.01)
*F16L 37/084* (2006.01)
*F16L 37/092* (2006.01)

(52) U.S. Cl.
CPC ............. *F16L 37/46* (2013.01); *F16L 37/084* (2013.01); *F16L 37/0927* (2019.08)

(58) Field of Classification Search
CPC ....... F16L 37/38; F16L 37/0927; F16L 37/42; F16L 37/1215; F16L 37/40; F16L 37/0842; F16L 37/086; F16L 37/091; F16L 37/092
USPC .......... 137/614–614.6, 798; 251/149–149.9; 285/317, 313, 316
See application file for complete search history.

(56) References Cited

U.S. PATENT DOCUMENTS 2,727,761 A * 12/1955 Elliott .................. F16L 37/088
137/625.68
2,888,278 A * 5/1959 Torres .................. F16L 37/127
285/313

(Continued)

FOREIGN PATENT DOCUMENTS

EP 2039974 A2 * 3/2009 .......... F16L 37/0925

*Primary Examiner* — Craig J Price

(57) ABSTRACT

A connector element (1), for a quick connect coupling to a terminal (3) having an interface (33) with a cylindrical enclosure, the connector element with a body delimiting an inner passage (43) for the fluid. In order for the connector to be able to be coupled reliably with terminals of variable dimensions and interface quality, the invention provides that the body has a conical portion (45) and that the connector element (1) has a movable bush (5), an elastic return member (8), which applies an elastic return force (F8) on the bush (5), and clamping pads (6) received in a respective housing (51) of the bush (5), the clamping pads being translated radially relative to the bush by mechanical cooperation with the conical portion, between a radial withdrawn position and a radial clamping position, to cooperate mechanically with the interface.

10 Claims, 13 Drawing Sheets

(56) References Cited

U.S. PATENT DOCUMENTS

| | | | | |
|---|---|---|---|---|
| 3,028,179 A * | 4/1962 | Abramoska | ............ | F16L 37/32 285/280 |
| 3,039,794 A * | 6/1962 | De Cenzo | ............... | F16L 37/34 285/317 |
| 3,164,361 A * | 1/1965 | Pruett | .................. | F16L 37/091 251/149.6 |
| 4,716,938 A * | 1/1988 | Weh | .................... | F16L 37/1215 138/93 |
| 5,005,877 A * | 4/1991 | Hayman | ............. | F16L 37/0842 285/317 |
| 5,078,170 A * | 1/1992 | Henry | .................... | F16L 37/32 285/320 |
| 5,095,947 A * | 3/1992 | Weh | ........................ | F16L 37/36 285/321 |
| 5,209,528 A * | 5/1993 | Weh | ...................... | F16L 37/121 285/315 |
| 5,404,909 A * | 4/1995 | Hanson | ............... | F16L 55/1007 62/50.7 |
| 5,564,471 A * | 10/1996 | Wilder | ................. | B67D 7/3218 137/614.04 |
| 5,628,344 A * | 5/1997 | Roberts | .................. | F16L 37/30 137/895 |
| 5,630,570 A * | 5/1997 | Lacroix | ................... | F16L 37/42 285/924 |
| 5,634,624 A * | 6/1997 | Lacroix | ................... | F16L 37/42 251/149.6 |
| 5,890,517 A * | 4/1999 | Laible | ..................... | F16L 37/22 137/614.04 |
| 5,927,683 A * | 7/1999 | Weh | .................... | F16L 37/1215 251/149.6 |
| 5,984,265 A * | 11/1999 | Engdahl | .................. | F16L 37/12 251/149.6 |
| 6,009,901 A * | 1/2000 | Roberts | .................. | F16L 37/36 137/614.01 |
| 6,035,894 A * | 3/2000 | Weh | .................... | F16L 37/1215 137/614.05 |
| 6,073,974 A * | 6/2000 | Meisinger | ........... | F16L 37/1215 285/86 |
| 6,283,443 B1 * | 9/2001 | Taneya | .................... | F16L 37/23 251/149.6 |
| 6,343,630 B1 * | 2/2002 | Dubinsky | ............... | F16L 37/44 251/149.6 |
| 6,375,152 B1 * | 4/2002 | Weh | .................... | F16L 37/1215 251/149.6 |
| 6,460,899 B1 * | 10/2002 | Ose | ..................... | F16L 37/0841 285/314 |
| 6,616,196 B1 * | 9/2003 | Weh | .................... | F16L 55/1015 285/124.1 |
| 6,786,516 B2 * | 9/2004 | Cronley | ............... | F16L 37/1215 285/322 |
| 6,883,779 B2 * | 4/2005 | Borgmeier | .......... | F16L 37/0982 251/149.6 |
| 6,926,310 B1 * | 8/2005 | Weh | ........................ | F16L 37/36 137/614.05 |
| 7,073,773 B2 * | 7/2006 | Nuttall | .................... | F16L 37/33 251/149.6 |
| 7,140,645 B2 * | 11/2006 | Cronley | ............... | F16L 37/1215 285/322 |
| 7,309,083 B2 * | 12/2007 | Tiberghien | ............... | F16L 37/42 285/317 |
| 7,424,897 B2 * | 9/2008 | Weh | ........................ | F16L 37/121 251/149.9 |
| 7,455,280 B2 * | 11/2008 | Parrish | ................ | F16L 37/0925 251/149.6 |
| 7,472,930 B2 * | 1/2009 | Tiberghien | ............... | F16L 37/42 285/308 |
| 7,494,158 B2 * | 2/2009 | Weh | ........................ | F16L 39/00 285/308 |
| 7,497,231 B2 * | 3/2009 | Sasa | ........................ | F16L 37/44 251/149.9 |
| 7,673,911 B2 * | 3/2010 | Liu | .......................... | F16L 37/40 285/924 |
| 7,766,393 B2 * | 8/2010 | Tiberghien | ........... | F16L 37/0985 285/317 |
| 7,793,914 B2 * | 9/2010 | Danielson | ............... | F16L 37/138 251/149.6 |
| 8,087,436 B2 * | 1/2012 | Danielson | ............... | F16L 21/04 285/119 |
| 8,123,258 B2 * | 2/2012 | Tiberghien | ............ | F16L 37/086 285/322 |
| 8,186,649 B2 * | 5/2012 | Aoki | ................... | F16L 37/0848 251/149.6 |
| 8,267,434 B2 * | 9/2012 | Engdahl | ................... | F16L 37/44 137/614.05 |
| 8,844,979 B2 * | 9/2014 | Danielson | ................ | F16L 37/18 251/231 |
| 8,882,080 B2 * | 11/2014 | Tiberghien | ............ | F16L 37/138 251/149.6 |
| 9,249,914 B2 * | 2/2016 | Kuo | ...................... | F16L 37/1215 |
| 9,322,500 B2 * | 4/2016 | Engdahl | ................. | F16L 37/138 |
| 9,534,735 B2 * | 1/2017 | Pitney | ........................ | F17C 5/06 |
| 9,617,819 B2 * | 4/2017 | Older | ......................... | F16L 1/26 |
| 9,816,653 B2 * | 11/2017 | Von Keitz | ............... | F16L 29/04 |
| 10,156,114 B2 * | 12/2018 | Partridge | .............. | F16L 37/002 |
| 10,442,287 B2 * | 10/2019 | Takezawa | ............... | F17C 5/007 |
| 10,525,820 B2 * | 1/2020 | Takezawa | ........... | H01M 8/0656 |
| 10,625,599 B2 * | 4/2020 | Takezawa | ................. | F17C 5/00 |
| 10,876,663 B2 * | 12/2020 | Danielson | ............. | F16L 29/002 |
| 11,174,974 B1 * | 11/2021 | Jiang | ........................ | F16L 37/40 |
| 11,193,631 B2 * | 12/2021 | Takezawa | ............... | F17C 5/007 |
| 11,326,727 B2 * | 5/2022 | Sung | .................. | F16L 37/0841 |
| 11,597,645 B2 * | 3/2023 | Clever | ..................... | B67D 7/04 |
| 11,603,954 B2 * | 3/2023 | Clever | ..................... | B67D 7/52 |
| 11,746,941 B2 * | 9/2023 | Search | ................ | F16L 37/1215 285/305 |
| 11,815,213 B2 * | 11/2023 | Durieux | ................. | F16L 37/42 |
| 11,867,331 B2 * | 1/2024 | Pastore | ................. | F16L 37/138 |
| 12,038,115 B2 * | 7/2024 | Jacobsen | ............. | F16L 37/0841 |
| 12,072,048 B2 * | 8/2024 | Rat | ....................... | F16L 33/227 |
| 12,129,949 B2 * | 10/2024 | Durieux | ................. | F16L 37/38 |
| 2004/0074541 A1 * | 4/2004 | Sharpe | .................. | F16L 37/121 137/614.04 |
| 2015/0069755 A1 * | 3/2015 | Bull | ....................... | F16L 37/122 29/450 |

* cited by examiner

CONNECTOR ELEMENT

CROSS-REFERENCE TO RELATED APPLICATIONS

The present application claims priority to French patent application no. 2101122, filed on Feb. 5, 2021.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to a connector element for a quick connect coupling of a fluid pipe to a terminal.

The connector element of the invention in particular aims to be connected to a terminal borne by, or making up, a liquid pipe end for a heat engine, belonging to an engine test bench. The transported fluid is therefore for example a coolant, a fuel, a lubricant, an exhaust gas or air. However, the present invention can be implemented for any other type of terminal and fluid.

Brief Discussion of the Prior Art

EP3247931B1 discloses a connector element for a quick connect coupling with a threaded or profiled terminal. The connector element includes a main body and clamps, which slide radially in housings of the body, between a first position in which the clamps are at a distance from the terminal, and a second position in which the clamps engage the terminal to keep it fitted within the main body. An auxiliary body controls the position of the clamps by translating axially relative to the main body. To this end, a conical functional part of the auxiliary body actuates the respective control pins of the clamps during the translation of the auxiliary body.

EP3320250B1 discloses a connector element for quick coupling with a terminal. To couple with the terminal, the connector element has jaws, which are moved radially while being guided by a radial guide annulus.

One drawback of the prior art is that the connectors are subject to disconnections when the quality and the dimensions of the terminal to be connected vary, in particular when the interface of the terminal is worn. This occurs in particular when the diameter of the terminal to be connected is too small relative to the nominal diameter of a standard terminal for which the jaws have been designed. In this case, it is possible that the jaws do not sufficiently clamp the terminal to keep it coupled with the connector element, or do not even engage with said terminal.

One aim of the invention is in particular to resolve this drawback by proposing a new connector element, which can be reliably coupled with terminals of variable interface dimensions and quality.

SUMMARY OF THE INVENTION

The invention relates to a connector element, for a quick connect coupling of a fluid pipe to a terminal, the terminal having an interface with a cylindrical enclosure, the connector element comprising a body designed to be secured with the fluid pipe and delimiting an inner passage for the fluid, the inner passage extending along a fitting axis of the connector element. According to the invention, the body comprises a conical portion, centered on the fitting axis. According to the invention, the connector element further comprises: a bush, which is translatable relative to the body along the fitting axis; a first elastic return member, which applies a first elastic return force on the bush, relative to the body, along a forward direction, and clamping pads, each clamping pad being received in a respective housing belonging to the bush, the clamping pads being moved in translation radially relative to the bush, within their respective housing, by mechanical cooperation of the clamping pads with the conical portion, between: a radial withdrawn position of the clamping pads, so that the clamping pads are remote from the interface of the terminal, and a radial clamping position of the clamping pads, so that the clamping pads cooperate mechanically with the interface of the terminal.

According to the invention, the connector element also comprises a bearing ring, which is translatable relative to the body along the fitting axis and which comprises a circumferential face, by means of which the bearing ring is in tight contact with the body, and a front face perpendicular to the fitting axis. According to the invention, the connector element also comprises a second elastic return member, which is formed by a spring and which applies a second elastic return force on the bearing ring to place the bearing ring in tight contact with the terminal by means of the front face.

Owing to the invention, the radial clamping position of the clamping pads is determined by the actual dimensions of the interface of the terminal that is coupled with the connector element. In fact, by radial bearing of the terminal on the clamping pads, the clamping pads are positioned axially along the conical portion, while the clamping pads are kept radially bearing against the terminal under the combined action of the first elastic return force, transmitted to the clamping pads by the bush, and the mechanical cooperation between the clamping pads and the conical portion, exerting an angle return. In the radial clamping position, the clamping pads are in equilibrium between the elastic return force transmitted by the bush, an oblique bearing of the clamping pads on the conical portion, and a radial bearing of the clamping pads on the interface of the terminal. The axial position of the bush along the conical portion, as well as the radial clamping position obtained for the clamping pads, then depend on the dimensions of the interface of the terminal with which the connector element is presently coupled. The clamping pads apply a radial clamping force on the terminal, which results from the first elastic return force and therefore does not depend, or depends little, on the dimensions of the interface of the terminal. The maintenance of the terminal by the pads is therefore reliable, even if the interface of the terminal does not have nominal dimensions and/or is worn.

Preferably, the conical portion defines a half aperture angle whose value is between 3 and 10 degrees, preferably equal to 5 degrees.

Preferably, each clamping pad has a cylindrical surface centered on the fitting axis, by means of which the clamping pad is designed to cooperate mechanically with the interface of the terminal when the clamping pad is in the radial clamping position.

Preferably, each cylindrical surface has a thread or a surface treatment increasing its coefficient of friction.

Preferably, a sealing diameter between the front face and the terminal is smaller than a sealing diameter between the circumferential face and the body.

Preferably, the body and the bearing ring are designed to delimit, with the terminal, an inner volume, for an exchange of fluid between the inner volume and the inner passage.

Preferably, the bearing ring is configured to keep the clamping pads in the radial withdrawn position when the connector element and the terminal are uncoupled.

Preferably, the bearing ring closes the inner passage when the connector element and the terminal are uncoupled.

Preferably, the connector element comprises a maneuvering ring, which is movable to an unlocked position, to release the terminal while the clamping pads were in the radial clamping position and were thus mechanically cooperating with the interface of the terminal.

Preferably, the maneuvering ring and the bush are secured in translation relative to the body, along the fitting axis.

Preferably, the conical portion faces toward the outside and diverges along the forward direction.

Preferably, the conical portion faces toward the inside and converges along the forward direction.

BRIEF DESCRIPTION OF THE SEVERAL VIEWS OF THE DRAWINGS

The invention will be better understood and other advantages thereof will appear in light of the following description, describing examples according to its principle, in reference to the following appended drawings.

DETAILED DESCRIPTION OF THE INVENTION

Figure 1:
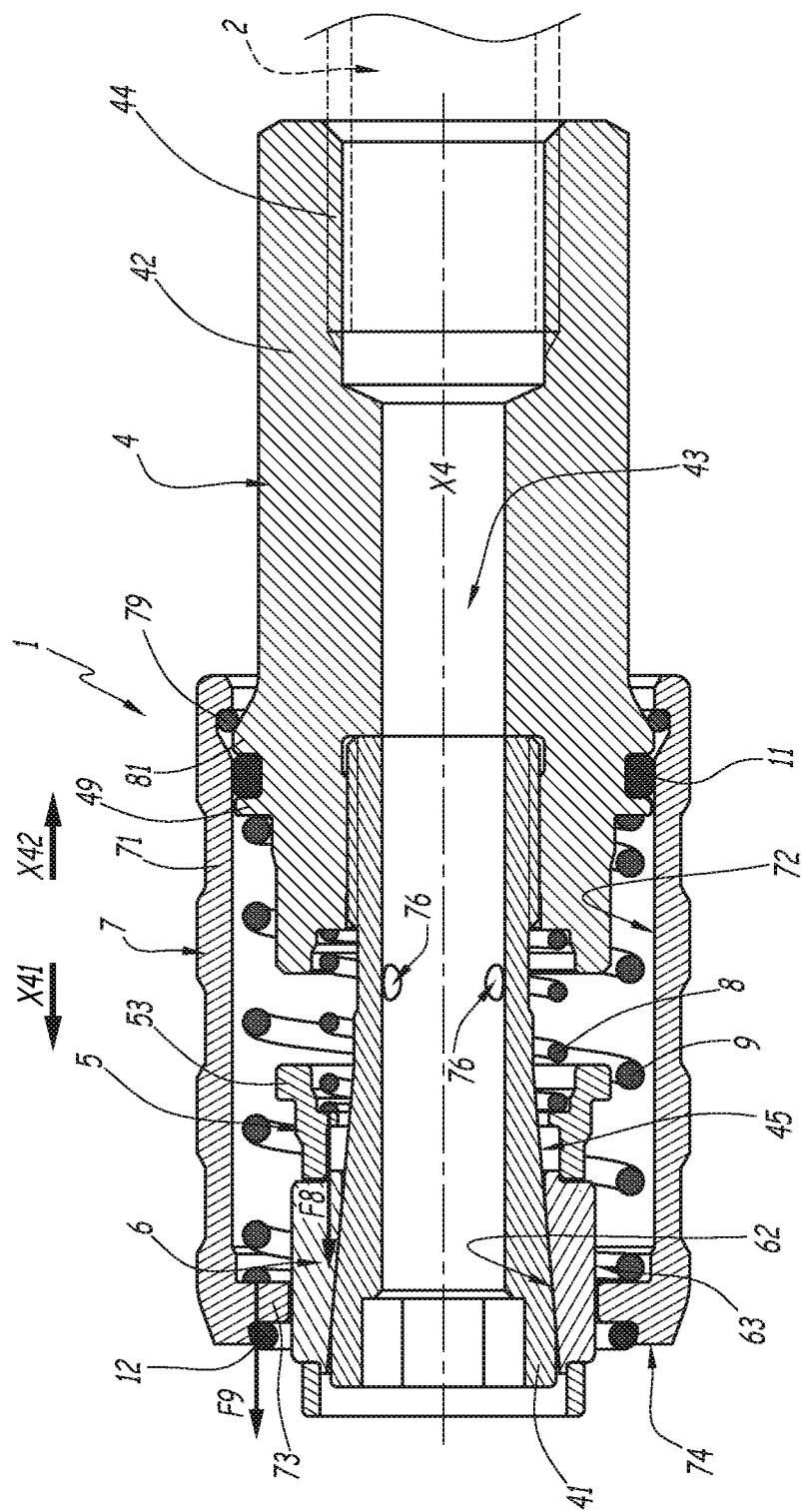
FIG. 1 is a longitudinal sectional view of a connector element, according to a first embodiment according to the invention.
Figure 2:
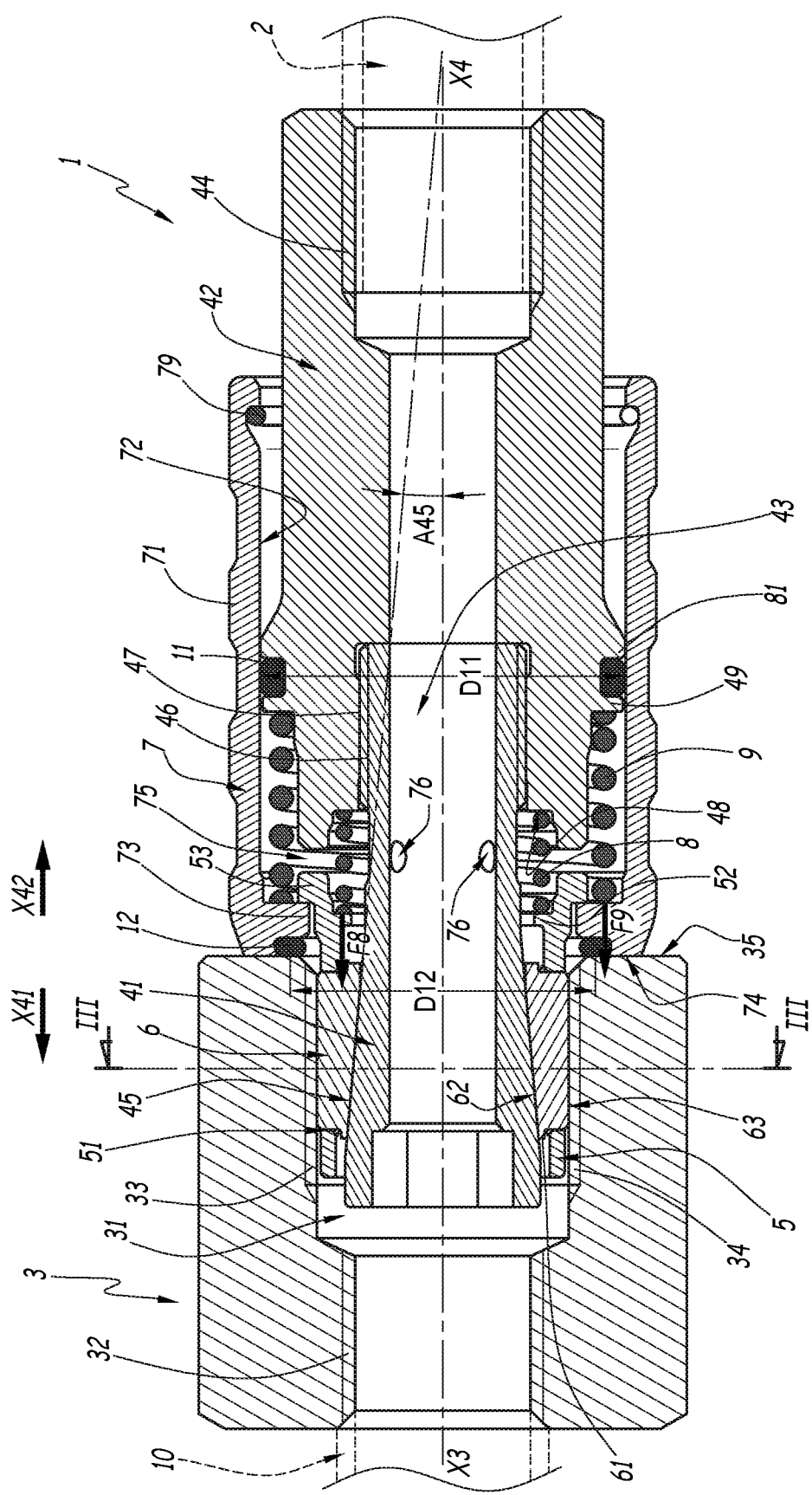
FIG. 2 is a sectional view similar to that of FIG. 1, where the connector element is coupled with a terminal.

FIGS. 1 and 2 show a connector element 1 according to a first embodiment, which is fluidly connected to a fluid pipe 2. FIG. 2 shows a terminal 3, which is fluidly connected to a fluid pipe 10. The connector element 1 and the terminal 3 together make up a quick connector, that is to say, the connector element 1 is designed for a quick connect coupling with the terminal 3. More specifically, the connector element 1 is designed to go between a coupled configuration, shown in FIG. 2, where the connector element 1 is fluidly connected to the terminal 3, and an uncoupled configuration, shown in FIG. 1, where the connector element 1 is separated from the terminal 3. In the coupled configuration, the connector element 1 and the terminal 3 conduct a fluid exchange between the pipes 2 and 10.

Preferably, the fluid thus exchanged aims to supply, or is emitted by, a heat engine, in particular belonging to an engine test bench. The transported fluid is therefore for example a coolant, a fuel, a lubricant, an exhaust gas or air. However, the connector can be implemented for another type of fluid and for another application.

As shown in FIG. 2, the terminal 3 defines a main axis X3 of the terminal 3. The expressions such as "axial," "radial," "centrifugal," "centripetal," "longitudinal" and "transverse" relative to the terminal 3 and the pipe 10 relate to the axis X3, unless otherwise mentioned.

The terminal 3 is formed by a tubular body in one piece, which extends along the axis X3 and is centered on the axis X3. The terminal 3 delimits an inner passage 31 for the fluid, which in turn is centered on the axis X3, extending along the axis X3 and opening at a distal end of the terminal 3 to be able to be coupled with the connector element 1, and at a proximal end to be fluidly connected to the pipe 10.

The connector element 1 is provided to be coupled with the terminal 3 via a distal end of the passage 31. This distal end of the passage 31 constitutes an interface 33, for the coupling of the terminal 3, which has a cylindrical enclosure coaxial with the axis X3. In other words, the interface 33 is formed by the distal opening of the passage 31. The interface 33 preferably forms a distal thread 34, which here is a tapping, at a distal end of the passage 31, centered on the axis X3 and by means of which the terminal 3 can thus be coupled.

The terminal 3 preferably forms a proximal thread 32, which here is a tapping, at a proximal end of the passage 31, centered on the axis X3. The terminal 3 is secured to the pipe 10 by the proximal end of the passage 31, preferably by means of this thread 32, so as to fluidly connect the pipe 10 and the terminal 3, so that the fluid is exchanged and conducted between the inside of the pipe 10 and the passage 31.

The connector element 1 comprises a body 4, a bush 5, clamping pads 6, a ring 7, a spring 8 and a spring 9.

The body 4 defines a fitting axis X4 of the connector element 1. In the coupling configuration, the axes X3 and X4 are coaxial. The expressions such as "axial," "radial," "centrifugal," "centripetal," "longitudinal" and "transverse" relative to the connector element 1 and the pipe 2 relate to the axis X4, unless otherwise mentioned. The body 4 also defines a forward direction X41 and a rear direction X42, opposite one another, and parallel to the axis X4. Regarding the connector element 1 and the pipe 2, the expressions "front" and "rear" respectively refer to the directions X41 and X42.

The body 4 has a general tubular shape centered on the axis X4, delimiting an inner passage 43 for the fluid, which in turn is centered on the axis X4, extending along the axis X4 and opening in the directions X41 and X42. The body 4 comprises a front part 41 and a rear part 42, which are fixedly secured to one another. The parts 41 and 42 are successively passed through by the inner passage 43, which they delimit. In other words, the parts 41 and 42 are both tubular and centered on the axis X4, the part 41 being arranged in the direction X41 relative to the part 42.

The rear part 42 preferably forms a thread 44, at a rear end of the passage 43, centered on the axis X4. The body 4 is secured to the pipe 2 by means of the rear end of the passage 43, preferably via this thread 44, so as to fluidly connect the pipe 2 and the body 4, so that the fluid is exchanged and conducted between the inside of the pipe 2 and the passage 43.

In order for the parts 41 and 42 to be fixedly secured, it is preferably provided that the part 41 bears a thread 46 at its rear end, here an outer thread, and that the part 42 bears a thread 47 at its front end, here an inner thread, such that the parts 41 and 42 are screwed one in the other via the threads 46 and 47. The threads 46 and 47 are advantageously centered on the axis X4.

The front part 41 has an outer surface, which extends around a front end of the passage 43 and which constitutes a conical portion 45. The conical portion 45 is centered on the axis X4. The conical portion 45 faces toward the outside, that is to say, away from the axis X4. The conical portion diverges along the forward direction X41, that is to say, it becomes larger along the direction X41. The conical portion 45 advantageously defines a half aperture angle A45, whose value is between 3 and 10 degrees, preferably equal to 5 degrees. This half aperture angle A45 constitutes the cone angle, that is to say, the angle that separates the conical portion 45 from the axis X4. In other words, two diametrically opposite generatrixes of the conical portion 45 form an angle whose value is equal to two times that of the half angle A45. The range of values proposed for the half angle A45 ensures the reliability of the locking of the terminal 3 by the pads 6 by mechanical cooperation of the pads 6 with the conical portion 45, as explained hereinafter.

Figure 3:
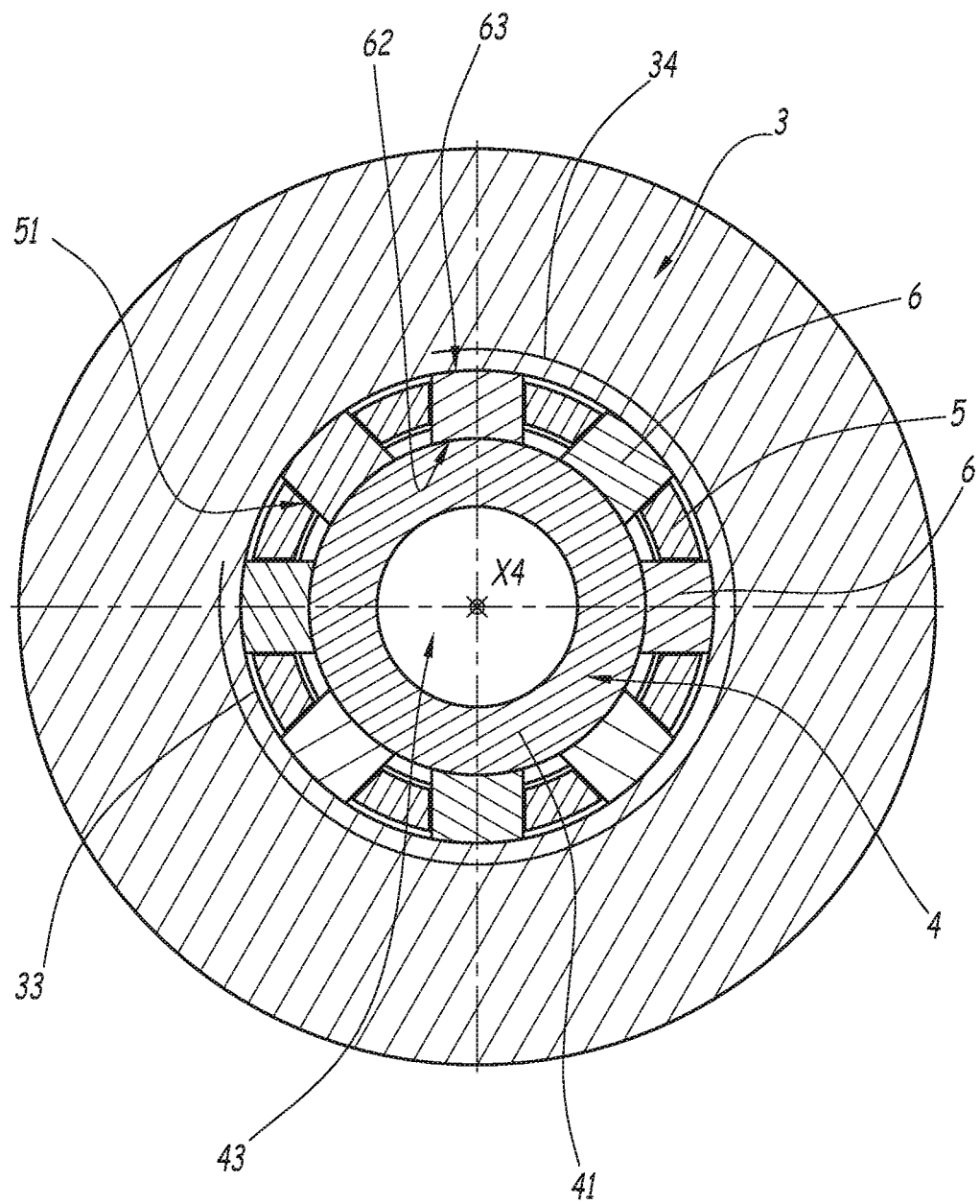
FIG. 3 is a cross-sectional view of the connector element along line III-Ill shown in FIG. 2.
Figure 4:
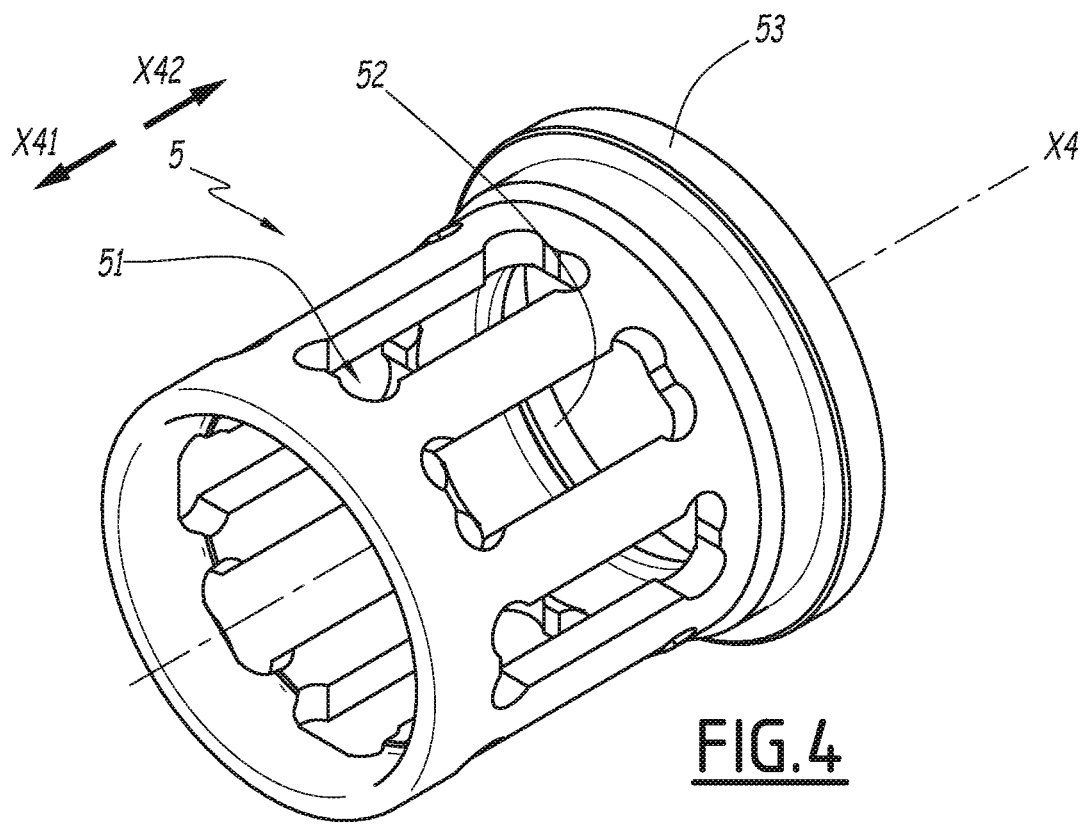
FIG. 4 is a perspective view of a bush belonging to the connector element of the preceding figures.

The bush 5, visible in FIGS. 1 to 3 and shown alone in FIG. 4, has a tubular shape centered on the axis X4. The bush 5 is arranged around the conical portion 45. The bush 5 is arranged so as to be able to translate relative to the body 4 parallel to the axis X4, along the conical portion 45.

The bush 5 contains housings 51, here eight housings 51. Preferably, the housings 51 are evenly distributed about the axis X4. Each housing 51 is made up of an opening that radially passes through the bush 5. In other words, each housing 51 is centered on a respective radial axis. Preferably, each housing 51 advantageously has a rectangular section. In the illustrated example, it is provided that the housing 51 has four walls that are parallel in pairs, including two axial walls and two orthoradial walls, that is to say, two walls that are perpendicular with an axis perpendicular to a radial axis.

Figure 5:
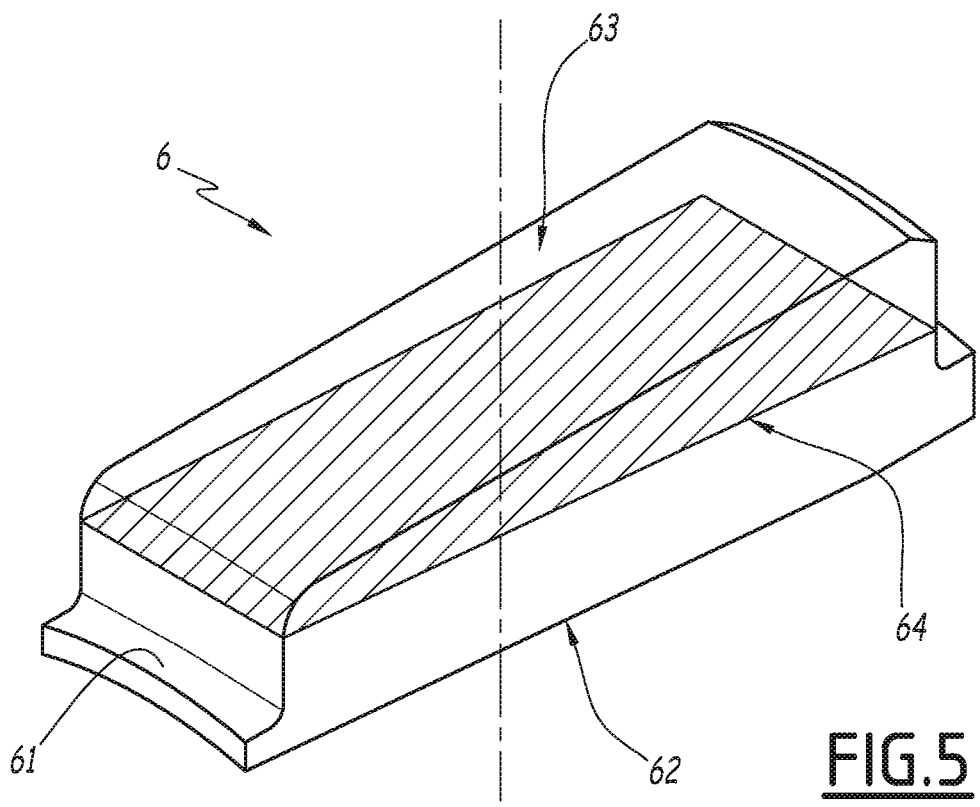
FIG. 5 is a perspective view of a clamping pad belonging to the connector element of the preceding figures.

The clamping pads 6 are visible in FIGS. 1 to 3, and one of the pads 6 is shown alone in FIG. 5. Each clamping pad 6 is received within one of the housings 51. Each pad 6 protrudes radially inward and radially outward from its respective housing 51. Each pad 6 has a prismatic portion of rectangular section 64, in a plane perpendicular to the radial axis of its housing 51. By complementarity of this prismatic portion and of the walls of the housing 51, the pad 6 is guided in radial translation in the housing 51. In other words, each pad 6 can translate radially relative to the bush 5, while its rotation is prevented by the housing 51. As a result, the pads 6 and the bush 5 are secured in translation relative to the body 4, along the axis X4, by mechanical cooperation of the housings 51 with its respective pad 6. At the very least, the bush 5 drives the pads 6 in translation along the axis X4.

Preferably, to ensure that each pad 6 remains captured by the bush 5 even in the uncoupled configuration, the centrifugal translation of the pad 6 relative to the bush 5 is bounded in an outer radial position of the pad 6, called "radial stop position," where the pad 6 abuts against the bush 5 in the centrifugal direction. To this end, for example, each pad 6 comprises a heel 61, which abuts against an inner radial surface of the bush 5 when the pad 6 reaches the radial stop position. To do this, the heel 61 is arranged radially between the bush 5 and the conical portion 45.

The spring 8, which is a compression spring, is axially inserted between the bush 5 and the body 4, in particular the rear part 42. The spring 8 is coaxial with the axis X4. For example, the spring 8 is a helical spring centered on the axis X4. It is advantageously provided that the spring 8 is inserted between an inner neck 52 belonging to the bush 5, and a front axial surface 48 formed at the front end of the rear part 42 of the body 4, withdrawn in the rear direction X42 relative to the conical portion 45. The spring 8 constitutes an elastic return member, which applies an elastic return force F8 on the bush 5, bearing on the body 4, this force F8 being oriented along the forward direction X41. In other words, an elastic return member is provided that translates the bush 5 in the forward direction X41.

On the side of the axis X4, therefore of the conical portion 45, each pad 6 advantageously has a conical surface 62, complementary to the conical portion 45 of the body 4. This conical surface 62 is therefore centered on the axis X4 and forms a half angle equal to the half angle A45. By solidarity in axial translation of the pads 6 and the bush 5, the bush 5 transmits the force F8 to the pads 6. The force F8 received by the bush 5 results in keeping the pads 6 bearing obliquely against the conical portion 45, by means of their respective conical surface 62. Thus, the radial position of the pads 6 with respect to the bush 5 depends on the axial position of the pads 6 with respect to the body 4, by mechanical cooperation between the pads 6 and the conical portion 45. The more the bush 5 and the pads 6 are moved in the forward direction X41, the more the pads 6 have a radially outer position with respect to the bush 5 under the action of the conical portion 45. The more the bush 5 and the pads 6 are moved in the rear direction X42, the more the pads 6 are translated relative to the bush 5 centripetally, while being allowed to do so by the conical portion 45.

As shown in FIG. 1, in the uncoupled configuration, the pads 6 are radially in the radial stop position, while being kept there under the action of the force F8 transmitted by the bush 5, and by oblique bearing of the pads 6 against the conical portion 45. In the radial stop position, the pads 6 emerge cleanly from the bush 5, here radially outward.

When the pads 6 are in the radial stop position, the bush 5 is in a forward position, called "axial stop position," relative to the body 4, along the axis X4.

Opposite the surface 62, that is to say, radially opposite the axis X4 and the conical portion 45, each pad 6 advantageously has a free surface, preferably made up of a cylindrical surface 63. The cylindrical surface 63 is designed to cooperate mechanically with the interface 33 of the terminal 3 when the connector element 1 is in the coupled configuration, to fixedly secure the terminal 3 and the connector element 1 by radial clamping. To do this, the cylindrical surface 63 is centered on the axis X4. Subject to the actual dimensions of the terminal 3, the curve radius of the surfaces 63 corresponds to the curve radius of the interface 33 of the terminal 3, so that the mechanical cooperation between the pads 6 and the interface 33 is optimal.

As shown in FIG. 1, in the uncoupled configuration, the cylindrical surface 63 is advantageously left free, while the pads 6 are in the radial stop position and the bush 5 is in the axial stop position.

As shown in FIG. 2, in the coupled configuration, the pads 6 are in an intermediate radial position, called "radial clamping position," relative to the bush 5. The obtained radial clamping position depends on the dimensions of the interface 33 of the coupled terminal 3. When the pads 6 are in the radial clamping position, the bush 5 and the pads 6 have an intermediate axial position along the axis X4, called "axial clamping position," relative to the body 4. This axial clamping position also depends on the dimensions of the interface 33 of the terminal 3, by angle return obtained owing to the conical portion 45.

In the coupled configuration, each pad 6 is radially inserted between the conical portion 45, by means of the surface 62, and the interface 33, by means of the surface 63. Preferably, the half angle A45 is chosen so that the pads 6 are not in a jamming situation, which is the case for the value ranges mentioned above for the half angle A45. The pads 6 being thus positioned, a clamping adherence between the surface 63 and the interface 33 is obtained, able to keep the terminal 3 thus fitted with the connector element 1 without this position being irreversible due to jamming. This mechanical cooperation between the pads 6 and the interface 33 is reinforced by the force F8 produced by the spring 8, which tends to maintain the adherence, by pushing the pads 6 in the direction X41 by means of the bush 5. In other words, one function of the bush 5 and of the conical portion 45 is to convert the force F8 applied on the bush 5 by the spring 8 into external radial forces applied by each pad 6 on the interface 33 of the terminal 3, for a mechanical cooperation between the pads and the interface 33 keeping the terminal 3 secured to the connector element 1.

Preferably, to reinforce the mechanical cooperation between the surface 63 and the interface 33, it is provided that the surface 63 bears a thread, which is advantageously complementary with the thread 34 to engage with the thread 34 in the coupling configuration. Thus, the thread borne by the surface 63 of the pads 6 is preferably coaxial with the axis X4. If the coupled terminal does not bear a thread, the thread of the surface 63 can nevertheless make it possible to increase the adherence with the interface of the terminal. In a variant, it is possible to provide that the surface 63 of the pads 6 has a surface treatment that increases the coefficient of friction of the surface 63, with respect to the other surfaces of the pad 6 that are provided to slide, such as the surface 62 and the lateral surfaces of the prismatic portion of the pad 6. The surface treatment is for example characterized by a greater roughness for the surface 63 than for the other surfaces of the pad 6.

The ring 7 has a globally tubular shape and surrounds the body 4. The ring 7 is centered on the axis X4. The ring 7 is translatable relative to the body 4 along the axis X4, between a forward axial position, called "idle position," shown in FIG. 1, and a rear axial position, called "unlocked position." The ring 7 can also assume an intermediate position, called "bearing position," between the front and rear positions, as shown in FIG. 2.

The translation of the ring 7 relative to the body 4 is guided by the body 4, in particular by the rear part 42. To this end, the ring 7 advantageously comprises a rear part 71 of tubular shape, which slides along the rear part 42 of the body 4. The connector element 1 advantageously comprises a seal 11, which is radially inserted between the body 4 and the ring 7, in particular between the rear part 42 and the rear part 71. Here, the seal 11 is placed in a peripheral groove arranged in the rear part 42. The seal 11 is for example an O-ring. The seal 11 comes into sliding outer radial contact with a circumferential face 72, here made up of an inner cylindrical wall belonging to the rear part 71 and coaxial with the axis X4. Annular fluid tightness is therefore ensured between the face 72 and the rear part 42 of the body 4 owing to the seal 11. In other words, the ring 7 is in tight contact with the body 4 by means of the circumferential face 72. The contact interface between the seal 11 and the ring 7 forms a coaxial circle with the axis X4, which has a diameter D11, called "sealing diameter." More generally, independent of whether the seal 11 is provided, it is advantageously provided that the tightness is engaged between the body 4 and the circumferential face 72 of the ring 7, at a circular interface that has a sealing diameter, here, the diameter D11.

At its front end, the ring 7 has an inner flange 73, which extends radially inward. The flange 73 forms an axial shoulder facing in the direction X42, and an axial shoulder facing in the direction X41. In the present example, as shown in FIG. 1, the flange 73 delimits an opening whose diameter is greater than the radial bulk of the pads 6, when the pads are in the radial stop position. In the uncoupled configuration, the flange 73 is advantageously positioned at the height of the pads 6, along the axis X4. The flange 73 then surrounds the pads 6, while arranging radial play between the pads 6 and the flange 73.

The spring 9, which is a compression spring, is axially inserted between the ring 7 and the body 4, in particular the rear part 42. The spring 9 is coaxial with the axis X4. Here, the spring 9 extends inside the ring 7, around the spring 8, the body 4 and the bush 5. For example, the spring 9 is a helical spring centered on the axis X4. It is advantageously provided that the spring 9 is inserted between the flange 73 and an outer neck 49 belonging to the body 4, here to the rear part 42. The outer neck 49 is arranged in the direction X41 relative to the seal 11, and preferably borders the groove receiving said seal 11. The outer neck 49 is arranged in the direction X42 relative to the flange 73. The spring 9 constitutes an elastic return member, which applies an elastic return force F9 on the ring 7, bearing on the body 4, this force F9 being oriented along the forward direction X41. In other words, an elastic return member is provided that translates the ring 7 in the forward direction X41.

The ring 7 is configured so that, when the ring 7 is moved in the direction X42 relative to the body 4, the ring 7 drives the movement of the bush 5. This movement of the ring 7 can be done by a user, since the ring 7 is on the outside of the connector element 1. To this end, the bush 5 advantageously has a radial outer flange 53, against which the flange 73 bears in the direction X42. However, a movement in the direction X41 of the ring 7 does not impose any movement of the bush 5.

The ring 7 has a front face 74, at its front end. The front face 74 is perpendicular to the axis X4. It is advantageously provided that the connector element 1 comprises a seal 12, which here is borne by the face 74. The seal 12 is centered on the axis X4. The seal 12 is preferably an O-ring. The seal 12 is preferably received in a front slot arranged in the front face 74, an axial bottom of which here is formed by the front axial shoulder of the flange 73.

As shown in FIG. 1, the face 74 is free in the uncoupled configuration. As shown in FIG. 2, the face 74 bears axially in the direction X41 against a distal face 35 of the terminal 3, by means of the seal 12. The distal face 35 extends at the periphery of the interface 33. In other words, the passage 31 opens from the distal face 35. The force F9 maintains the axial bearing of the ring 7 against the terminal 3, and therefore maintains the tightness between the ring 7 and the terminal 3 by means of the seal 12. In this way, the ring 7 constitutes a "bearing ring." The contact interface between the seal 12 and the terminal 3 forms a coaxial circle with the axis X4, which has a diameter D12, called "sealing diameter." More generally, independent of whether the seal 12 is provided, it is advantageously provided that the tightness is engaged between the terminal 3 and the front face 74 of the ring 7, at a circular interface that has a sealing diameter, here, the diameter D12.

As shown in FIG. 1, in the uncoupled configuration, the ring 7 is in the idle position relative to the body 4, while being kept axially bearing against the body 4 in the direction X41, by the force F9. This bearing, for example obtained by bearing in the direction X41 of an inner shank 79, borne at the rear end of the ring 7, against an outer neck 81 formed by the rear part 42 of the body 4. The neck 81 is preferably in the direction X42 relative to the seal 11. The neck 81 and the neck 49 advantageously delimit between them the groove receiving the seal 11.

In the coupled configuration, due to the aforementioned seals, the body 4, the ring 7 and the terminal 3 together delimit an inner volume 75 that is able to exchange fluid with the inner passage 43. The inner volume 75 is tubular in shape. The inner volume 75 is delimited, radially outwardly, by the ring 7, the seal 12 if it is provided, and the interface 33. The inner volume 75 is delimited, radially inwardly, by the body 4, in particular the front part 41 and the rear part 42, which radially separate the inner volume 75 from the passage 43. The inner volume 75 is coaxial with the passage 43. Toward the rear, the inner volume is delimited by the rear part 42 of the body 4 and the seal 11. Toward the front, the inner volume 75 is delimited by the terminal 3, in particular the distal face 35 and the interface 33, by the front part 41, which are partially obstructed by the bush 5 and the pads 6. The springs 8 and 9 are arranged in the inner volume 75, as well as the rear end of the bush 5. The front part 41 of the body 4 advantageously includes radial openings 76, which pass all the way through the front part 41, preferably opening from the conical portion 45, to connect the passage 43 with the inner volume 75 and thus to allow the exchange of fluid between them. Fluid can also be exchanged between the passage 31 and the inner volume 75, via the annular gap arranged between the front part 41 and the interface 33, which is not tightly closed off by the bush 5 and the pads 6. The inner volume 75 is nevertheless fluid-tight with respect to the outside of the connector, by the tightness that is provided between the ring 7 and the terminal 3, and between the ring 7 and the body 4.

Providing this inner volume 75 makes it possible to further improve the reliability of the coupling of the terminal 3 with the connector element 1 when fluid circulates within the connector in the coupled configuration. In fact, in this situation, the volume 75 is flooded by fluid, coming from the passage 43 and/or the passage 31, which is pressurized and maintains the coupling. To obtain this maintenance, it is advantageously provided for the sealing diameter D12 to be smaller than the sealing diameter D11, as shown in FIG. 2, such that the pressure of the fluid received in the volume 75 results in a force, applied against the ring 7 relative to the body 4, in the direction X41. At the very least, it is possible to provide that the diameter of the seal 12 is smaller than that of the seal 11.

To transition the connector element 1 from the uncoupled configuration to the coupled configuration, that is to say, to couple the connector, the terminal 3 and the body 4 of the connector element 1 are placed such that the axes X3 and X4 are aligned, while the distal end of the terminal 3 faces the front end of the connector element 1. The body 4 of the element 1 and the terminal 3 are then brought closer to one another. Before the terminal 3 and the element 1 come into contact, the element 1 is in the uncoupled configuration shown in FIG. 1.

In a first stage of the approach, the front face 74 of the bearing ring 7 comes into tight contact with the distal face 35 of the terminal 3, here via the seal 12. On continuing the approach, the pads 6 come into contact with a distal edge of the passage 31, that is to say, here at the junction between the opening of the passage 31 and the distal face 35. The approach then causes the pads 6 to be moved in the direction X42 relative to the body 4, under the action of the terminal 3, driving the bush 5 with them, against the force F8. Thus moved in the direction X42, the pads 6 slide along the conical portion 45 and move radially inward. This movement of the pads 6 continues over the course of the approach, until the pads 6 reach the radial clamping position and the bush 5 reaches the axial clamping position. In this radial clamping position, the pads 6 occupy a bulk equal to or slightly smaller than that of the interface 33, such that the pads 6 cease to move relative to the body 4, being axially retained by the force F8, and penetrate the passage 31 while covering the interface 33.

The approach of the terminal 3 and the body 4 ends when the inner flange 73 of the bearing ring 7 bears axially against the flange 53 of the bush 5. The coupling configuration shown in FIG. 2 is then reached. In this situation, trying to move the terminal 3 away from the body 4 along the axis X4 causes, under the action of the spring 8, the application of a radial maintaining force by the pads 6 against the interface 33 of the terminal 3, which keeps the connector element 1 secured to the terminal 3.

To uncouple, that is to say, to transition the connector element 1 from the coupled configuration to the uncoupled configuration, the body 4 of the connector element 1 is first pushed back toward the terminal 3 along the axis X4 in order to reduce the radial force applied by the pads 6 on the interface 33 and thus to defuse their adherence. Simultaneously or successively, the ring 7 is moved in the direction X42 relative to the body 4, toward the unlocked position, against the force F9. The tightness at the front face 74 is then broken. Additionally, the ring 7 drives the bush 5, and therefore the pads 6, in the direction X42 relative to the body 4.

In this movement, by mechanical cooperation with the conical portion 45, the pads 6 are allowed to move radially inward relative to the bush 5, that is to say, along a centripetal direction, to a position called "radial withdrawn position." In other words, the bush 5 being moved in the direction X42, the pads 6 are positioned at an axial level of the conical portion 45 where the conical portion 45 is more withdrawn, radially inward, thus allowing the pads to be moved centripetally. In this radial withdrawn position, the pads 6 are no longer constrained by the conical portion 45 to exert a force against the interface 33, or are radially remote from the interface 33. In this radial withdrawn position, the pads 106 are arranged inside a virtual cylinder, the diameter of which is smaller than the diameter of the interface 33 of the terminal 3. The radial withdrawn position depends on the geometry of the interface 33 of the terminal 3, and can therefore differ from one terminal to another. For a given terminal, the radial clamping position is an intermediate position between the radial stop position and the radial withdrawn position of the pads 6. When the pads 6 are in the radial withdrawn position, the bush 5 is in an axial withdrawn position, to the rear relative to the axial clamping position.

More generally, moving the ring 7 toward its unlocked position, that is to say, toward the rear, while the connector element 1 is in the coupled configuration, results in releasing the terminal 3, thus causing the connector element 1 to enter the uncoupled configuration. The ring 7 can therefore be described as a "maneuvering ring." Here, the ring 7 therefore performs both a bearing ring function and a maneuvering ring function.

Once the pads reach the radial withdrawn position, the connector element 1 and the terminal 3 are released from one another, no longer being retained by the pads 6. It is then possible to move the connector element 1 and the terminal 3 away from one another along the axis X4 until they are completely separated, then to release the ring 7. Releasing the ring 7 allows the spring 8 to return the bush 5 in the direction X41 relative to the body 4, under the force F8, until the pads 6 reach their radial stop position, where their respective heel 61 outwardly radially abuts against the bush 5. The uncoupled configuration shown in FIG. 1 is then obtained. The return of the ring 7 along the direction X41, to its idle position shown in FIG. 1, is allowed owing to the fact that the flange 73 delimits an opening whose diameter is greater than the radial bulk of the pads 6, when the pads 6 are in the radial stop position.

For this embodiment, it is not provided for the ring 7 to keep the pads 6 in the radial withdrawn position.

Figure 6:
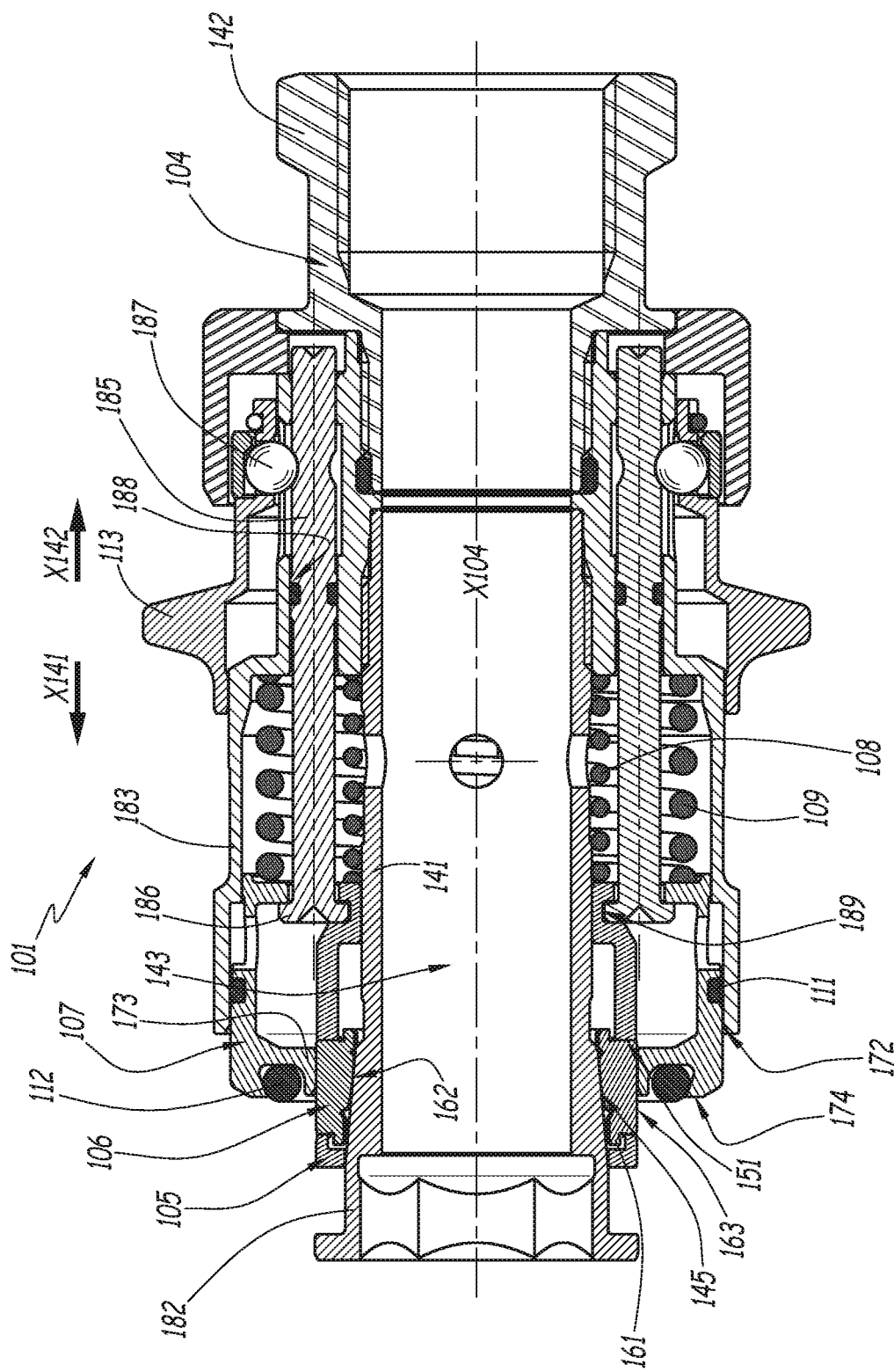
FIG. 6 is a longitudinal sectional view of a connector element, according to a second embodiment according to the invention.
Figure 7:
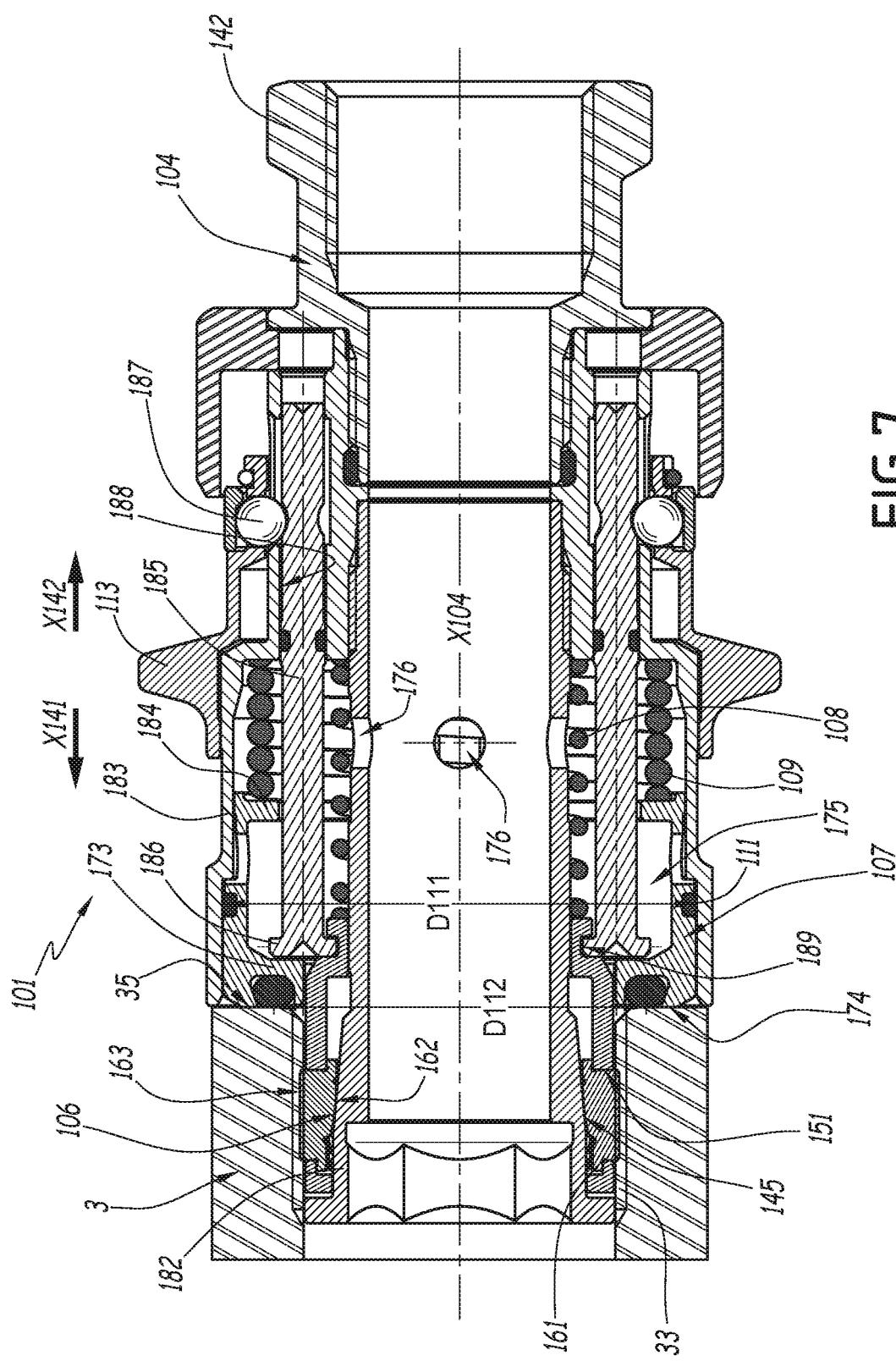
FIG. 7 is a sectional view similar to that of FIG. 6, where the connector element is coupled with a terminal.

FIGS. 6 and 7 show a connector element 101 according to a second embodiment. This connector element 101 includes characteristics in common with the connector element 1, which are identified with the same reference sign increased by 100. The characteristics described in the preceding for the connector element 1 apply to the connector element 101, aside from the differences described hereinafter. Hereinafter, some features that are identical, or based on the same principles, between the element 1 and the element 101 are not explained again, and reference should be made to the description of the element 1.

In FIG. 6, the element 101 is shown in the uncoupled configuration. In FIG. 7, the element 101 is shown in the coupled configuration. The element 101 is designed for a quick connect coupling with the terminal 3 described above, visible in FIG. 7.

The connector element 101 comprises a body 104, a bush 105, clamping pads 106, a ring 107, a spring 108, a spring 109 and a ring 113.

The body 104 is of generally tubular shape. The element 101 is designed to be secured with the fluid pipe 2 by the rear end of the body 104. The body 104 defines a fitting axis X104 of the connector element 101. In the coupling configuration, the axes X3 and X104 are coaxial. The body 104 also defines a forward direction X141 and a rear direction X142, opposite one another, and parallel to the axis X104.

The body 104 has a general tubular shape centered on the axis X104, delimiting an inner passage 143 for the fluid, which in turn is centered on the axis X104, extending along the axis X104 and opening in the directions X141 and X142. The body 104 comprises a front part 141 and a rear part 142, which are fixedly securely assembled. The parts 141 and 142 are successively passed through by the inner passage 143, which they delimit.

The rear part 142 of the body 104 is designed to be secured with the pipe 2 by means of the rear end of the passage 143, so as to fluidly connect the pipe 2 and the body 104.

The front part 141 comprises a tubular inner part 182, which delimits the front end of the passage 143 and has an outer surface constituting a conical portion 145, around the front end of the passage 143. The conical portion 145 is centered on the axis X4 and faces toward the outside. The conical portion 145 diverges along the forward direction X141.

The front part 141 also comprises a peripheral part 183, which is secured to the inner part 182, and which forms a skirt in the direction X141, extending around the inner part 182 and centered on the axis X104.

The bush 105 is of annular shape centered on the axis X104. The bush 105 is arranged around the conical portion 145, so as to be able to translate relative to the body 104 parallel to the axis X104, along the conical portion 145.

The bush 105 contains housings 151, which are distributed about the axis X104. Each housing 151 is made up of an opening that radially passes through the bush 105.

Each clamping pad 106 is received within one of the housings 151, so as to be guided in radial translation in this housing 151. As a result, the pads 106 and the bush 105 are secured in translation relative to the body 104, along the axis X4, according to the same principle as for the connector element 1. Each pad 106 has a heel 161 to be kept captured by the bush 105, even in the uncoupled configuration. The centrifugal translation of the pad 106 relative to the bush 105 is bounded in an outer radial position of the pad 106, called "radial stop position," where the pad 106 abuts against the bush 105 in the centrifugal direction.

The spring 108, which is a compression spring, is axially inserted between the bush 105 and the body 104, in particular the peripheral part 183. The spring 8 is coaxial with the axis X4. The spring 108 constitutes an elastic return member, which applies an elastic return force on the bush 105, bearing on the body 104, this force being oriented along the forward direction X141, so as to return the bush 105 in the direction X141.

Each pad 106 advantageously has a conical surface 162, complementary to the conical portion 145, by means of which the pad 106 slides along the conical portion 145. By mechanical cooperation between the pads 106 and the conical portion 145, the axial position of the bush 105 and the radial position of the pads 106 relative to the body 4 depend on one another. Under the action of the spring 8, the pads 6 are kept in contact with the conical portion 145.

Opposite the surface 162, each pad 106 advantageously has a cylindrical surface 163, to cooperate mechanically with the interface 33 of the terminal 3 in the coupled configuration. As shown in FIG. 7, in the coupled configuration, the pads 106 are in an outer radial position, called "radial clamping position," relative to the bush 105, to thus cooperate with the interface 33. This radial clamping position corresponds to a forward position of the bush 105, called "axial clamping position," along the axis X104, relative to the body 104, owing to the angle return of the conical portion 145.

The ring 113 has a globally tubular shape, centered on the axis X104. The ring 113 is advantageously arranged around the body 104, in particular around a rear end of the peripheral part 183, so as to be able to be actuated by a user. The ring 113 is translatable relative to the body 104 along the axis X104, between a rear axial position, called "unlocked position," shown in FIG. 6, and a forward position, called "initial position," shown in FIG. 7.

The connector element 101 further comprises tie rods 185, which extend parallel to the axis X104. The tie rods 185 are evenly distributed about the axis X104. The tie rods 185 extend radially to the inside of the ring 113. Each tie rod 185 is translatable relative to the body 104, along the axis X104. Each tie rod 185 is guided in this translation by a respective duct 188, belonging to the body 104. Preferably, for each tie rod 185, a seal is radially interposed between the duct 188 and said tie rod 185 for tight closure of the ducts 188 by the tie rods 185. For each tie rod 185, the connector element 101 further comprises a respective ball 187, by means of which the concerned tie rod 185 and the ring 113 are secured in translation relative to the body 104, along the axis X104. Furthermore, the bush 105 and the tie rods 185 are secured in translation along the axis X104. To do this, preferably, each tie rod 185 has a respective head 186 at its front end, which is received in a rear groove 189 of the bush 105.

The ring 113, the balls 187, the tie rods 185 and the bush 105 constitute an assembly, which is securely translatable relative to the body 104, along the axis X104. An axial movement of the ring 113 causes a movement of the bush 105, such that the ring 113 can be described as "maneuvering ring."

The ring 107 has a globally tubular shape, centered on the axis X104. The ring 107 arranged around the inner part 182, the pads 106 and the bush 105, while being received inside the peripheral part 183. The ring 107 is translatable relative to the body 104 along the axis X104, between a rear axial position, called "axial withdrawn position," shown in FIG. 6, and a forward position, called "axial clamping position," shown in FIG. 7. The translational guiding of the ring 107 is advantageously obtained by sliding of the ring 107 in the peripheral part 183.

In the uncoupled configuration, as shown in FIG. 6, the ring 107 is in a forward axial position, called "idle position," while axially abutting against the head 186 of the tie rod 185, along the direction X141, while the ring 113 is in the unlocked position, which is a rear axial position. More generally, the movement in the direction X141 of the ring 107 is limited by the axial position of the maneuvering ring 113. In other words, by being moved in the direction X142, the maneuvering ring 113 can drive the ring 107 in the direction X142 relative to the body 104.

The spring 109, which is a compression spring, is axially inserted between the ring 107 and the body 104. The spring 109 constitutes an elastic return member, to apply an elastic return force in the direction X141 on the ring 107 relative to the body 104, returning the ring 107 in the forward direction. Preferably, the spring 109 is inserted between a rear inner flange 184 of the ring 107 and a front axial shoulder of the peripheral part 183 of the body 104. Preferably, it is also by means of the flange 184 that the ring 107 abuts against the heads 186 in the direction X141.

The ring 107 comprises a circumferential face 172, by means of which the ring 107 is in tight contact with an inner wall of the peripheral part 183 of the body 104. The tight contact is procured by means of a seal 111 received in a peripheral groove of said face 172. Here, the circumferential face 172 is an outer face, unlike the element 1, where the face 72 is an inner face. Here, it is the ring 107 that bears the seal 111, unlike the element 1, where the body 4 bears the seal 11. The contact interface between the seal 111 and the body 104 forms a coaxial circle with the axis X104, which has a sealing diameter D111.

The ring 107 also comprises a front face 174 that is designed to come into tight contact with the distal face 35 of the terminal 3, in the coupled configuration, under the action of the spring 109. In this way, the ring 107 constitutes a "bearing ring." The front face 174 is preferably formed on an inner flange 173 of the ring 107, formed at its front end. The tight contact is procured by means of a seal 112 received in a front slot of the front face 174. The contact interface between the seal 112 and the terminal 3 forms a coaxial circle with the axis X104, which has a sealing diameter D112, which is smaller than the sealing diameter D111 formed by the seal 111. Preferably, the seal 112 has a diameter smaller than that of the seal 111.

In the coupled configuration, the ring 107 is in a rear position, called "bearing position," shown in FIG. 7.

In the uncoupled configuration, as shown in FIG. 6, while the ring 107 is in the idle position, the pads 106 bear radially against the flange 173. In this situation, the ring 107 keeps the pads 106 in an inner radial position, which constitutes a "radial withdrawn position." In other words, the ring 107 opposes a movement in the direction X141 of the bush 105 despite the action of the spring 8, the bush 105 and the pads 106 being kept in a rear axial position relative to the body 104, called "axial withdrawn position." In the radial withdrawn position, the pads 106 are arranged inside a virtual cylinder, the diameter of which is smaller than the diameter of the interface 33 of the terminal 3. In other words, in the uncoupled configuration, the pads are in a radial position where they would be radially distant from the interface 33, if the interface 33 were to surround them. This maintenance of the pads 106 in a radial withdrawn position by the ring 107 is a significant difference relative to the connector element 1 in which, in the uncoupled configuration, the pads are in the radial stop position and not in the radial withdrawn position, the ring 7 not providing the radial maintenance of the pads 6. Another difference is that the ring 107 does not come into contact with the bush 105, in particular such that the ring 107 does not impose an axial movement of the bush 105 when the ring 107 is itself axially moved.

In the coupled configuration, due to the tightness obtained for the front face 174 and the circumferential face 172, the body 104, the ring 107 and the terminal 3 together delimit an inner volume 175 capable of exchanging fluid with the inner passage 143, via radial openings 176 arranged through the part 182. Fluid can also be exchanged between the passage 31 and the inner volume 175, via the annular gap arranged between the front part 141 and the interface 33.

The inner volume 175 is tubular in shape, coaxial with the passage 143. The inner volume 175 is delimited, radially outwardly, by the peripheral part 183, the ring 107, the seal 112, the seal 111 and the interface 33. The inner volume 75 is delimited, radially inwardly, by the part 182, which radially separates the inner volume 175 from the passage 143. Toward the rear, the inner volume 175 is delimited by the part 183, by tightly closing off the ducts 188 by the tie rods 185. Toward the front, the inner volume 175 is delimited by the terminal 3, in particular the distal face 35 and the interface 33, by the part 182, which are partially obstructed by the bush 105 and the pads 106. The springs 108 and 109 are arranged in the inner volume 175. The inner volume 175 is nevertheless fluid-tight with respect to the outside of the connector, by the tightness that is provided between the ring 107 and the terminal 3, and between the ring 107 and the body 104.

Providing this inner volume 175 makes it possible to further improve the reliability of the coupling of the terminal 3 with the connector element 101 when fluid circulates within the connector in the coupled configuration, similarly to the inner volume 75 provided for the connector element 1.

To couple the connector, the terminal 3 and the body 104 are placed by aligning the axes X3 and X104, while the distal end of the terminal 3 faces the front end of the connector element 101. The body 104 and the terminal 3 are then brought closer to one another. Before the terminal 3 and the element 101 come into contact, the element 101 is in the uncoupled configuration shown in FIG. 6.

As shown in FIG. 6, the pads 106 are kept in the radial withdrawn position by the ring 107. In a first stage of the approach, the pads 106 penetrate directly in the passage 31, without rubbing, or rubbing little, with the interface 33. Continuing the approach, the front face 174 of the bearing ring 107 comes into tight contact with the distal face 35 of the terminal 3, here via the seal 112. The approach continuing, the ring 107 is moved in the direction X142 relative to the body 104 by the terminal 3, against the force produced by the spring 109. When the ring 107 reaches an axial position midway between the bearing position and the idle position, the ring 107 allows the pads 106 to be moved toward the radial clamping position, by cooperation of the pads 106 with the conical portion 145, under the action of the spring 8 axially driving the bush 105 in the forward direction X141 relative to the body 104. The bush 105 and the ring 113 being secured in axial translation relative to the body 104, the ring 113 is moved, from its rear position, in the direction X141 secured with the bush 105.

This axial forward movement of the assembly including the bush 105, the pads 106 and the ring 113 is done until the pads 106 reach the radial clamping position shown in FIG. 7. At that moment, the connector element 101 is in the coupled configuration, the bush 105 and the ring 113 are in a forward axial position, that is to say, in the axial clamping position of the bush 105 and in the initial position of the ring 113. In this axial position of the bush 105 and the ring 113, the pads 106 are in the radial clamping position.

To uncouple the connector element 101, the body 104 is pushed back toward the terminal 3 along the axis X4 in order to reduce the radial force applied by the pads 106 on the interface 33 and thus to defuse their adherence. Simultaneously or successively, the ring 113 is moved in the direction X142 relative to the body 104, against the force of the spring 109, to the unlocked position. This movement securely causes the movement of the bush 105 in the direction X142 relative to the body 104, and therefore the movement of the pads 106 toward the radial withdrawn position, by cooperation with the conical portion 145. The action of the ring 113 therefore makes it possible to release the terminal 3 from the pads 106, for which reason the ring 113 can be qualified as a maneuvering ring. When the terminal 3 is removed, the spring 109 axially moves the ring 107 in the direction X141, to its idle position, where the ring 107 captures and keeps the pads 106 in their radial withdrawn position, by means of the neck 173. The uncoupling configuration of FIG. 6 is then reached. In this configuration, the bush 105 is in the axial withdrawn position, secured with the ring 113, which is in the unlocked position.

Figure 8:
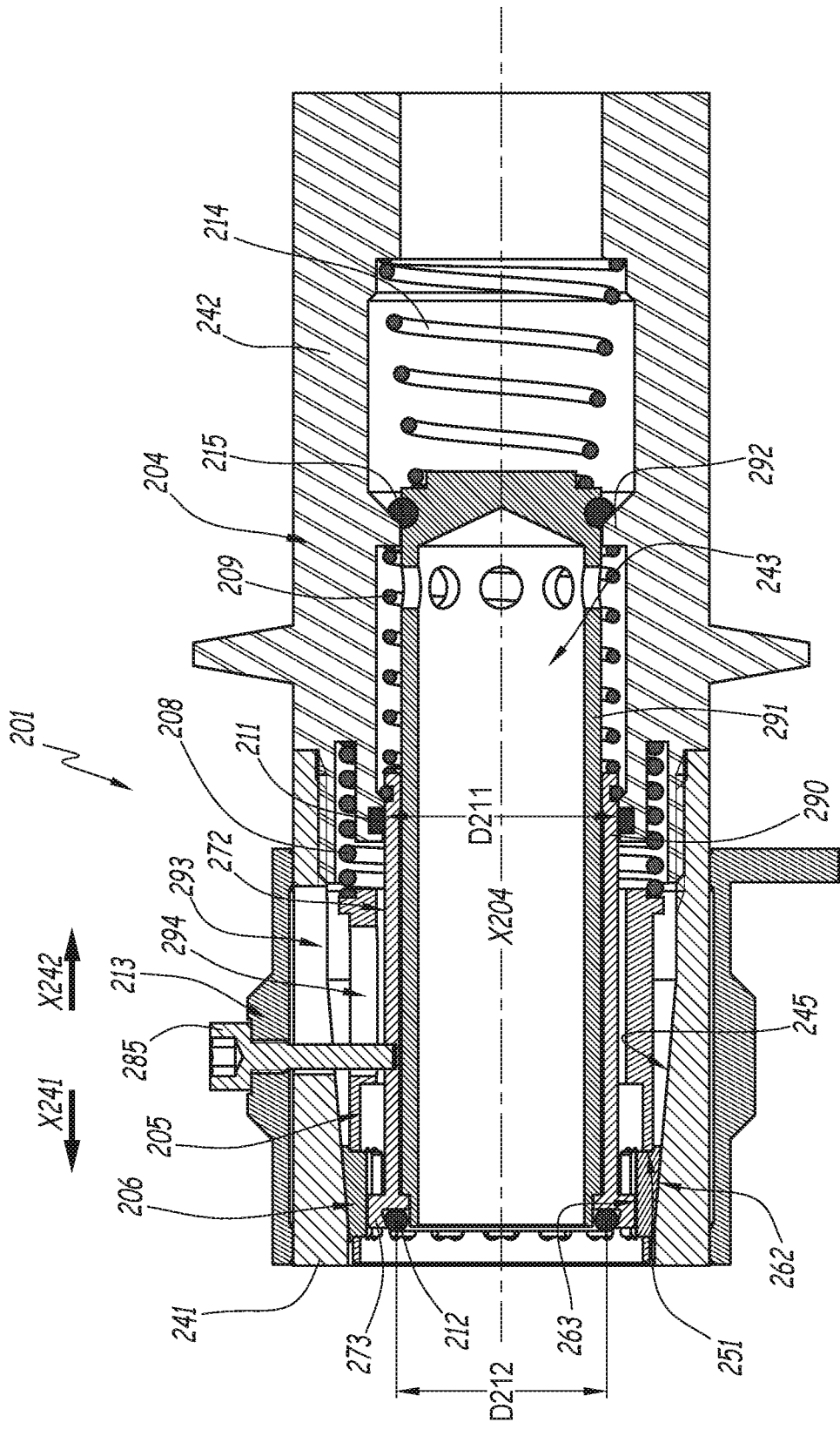
FIG. 8 is a longitudinal sectional view of a connector element, according to a third embodiment according to the invention.
Figure 9:
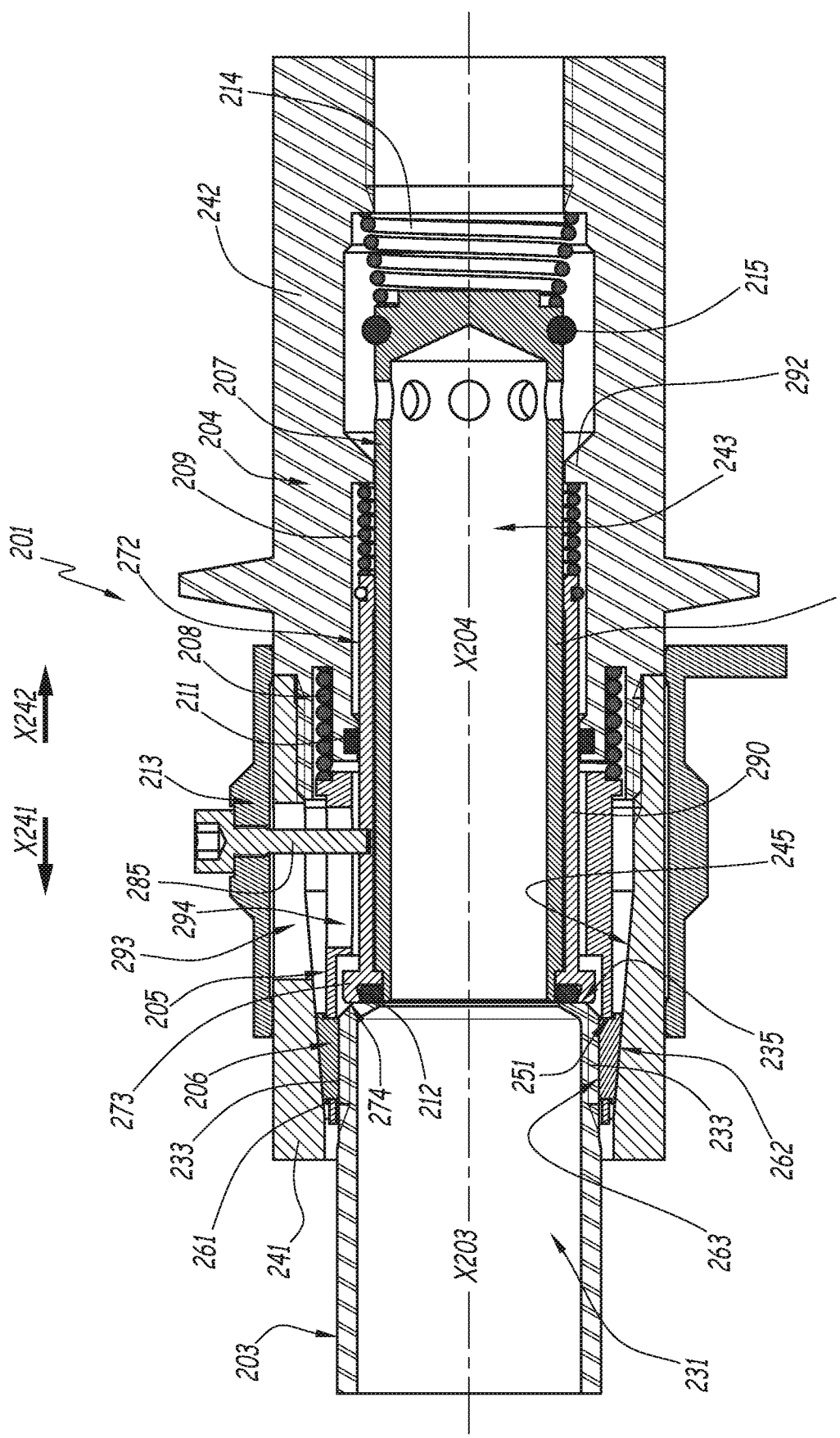
FIG. 9 is a sectional view similar to that of FIG. 8, where the connector element is coupled with a terminal.

FIGS. 8 and 9 show a connector element 201 according to a third embodiment. This connector element 201 includes characteristics in common with the connector element 1 and with the connector element 101, which are identified with the same reference sign increased by 200 with respect to the reference signs for the connector element 1. The features described in the preceding for the connector elements 1 and 101 apply to the connector element 201, aside from the differences described hereinafter. Hereinafter, some features that are identical, or based on the same principles, between the element 1, 101 and the element 201 are not explained again, and reference should be made to the preceding description.

In FIG. 8, the element 201 is shown in the uncoupled configuration. In FIG. 9, the element 201 is shown in the coupled configuration. The element 201 is designed for a quick connect coupling with a terminal 203 that differs from the terminal 3 described above, visible in FIG. 9.

The terminal 203 is tubular and centered on an axis X203, and arranges an inner passage 231 for the fluid. The terminal 203 has an interface 233, which is formed at a distal end of the terminal 203. Unlike the interface 33, the interface 233 is formed on the outside of the terminal 203 and not in the inner passage. Preferably, the interface 233 is threaded. The terminal 203 also includes a distal face 235 at its distal end, from which the passage 231 opens, and from which the interface 233 extends toward the proximal end of the terminal 203.

The connector element 201 comprises a body 204, a bush 205, clamping pads 206, a ring 207, a spring 208, a spring 209 and a ring 213.

The tubular body 204 extends along a fitting axis X204 and defines a forward direction X241 and a rear direction X242. The element 201 is designed to be secured with a fluid pipe by the rear end of the body 204.

In the coupling configuration, the axes X203 and X204 are coaxial.

The body 204 comprises a front part 241 and a rear part 242, which are fixedly securely assembled. The parts 241 and 242 are successively passed through by an inner passage 243 of the body 204, which they delimit for the circulation of the fluid.

The front part 241 has an inner surface constituting a conical portion 245, which delimits the front end of the passage 243. The conical portion 245 is centered on the axis X204 and faces toward the inside, unlike the conical portion 45. The conical portion 245 converges along the forward direction X241, that is to say, it becomes narrower in this direction.

The bush 205 is of tubular shape centered on the axis X204. The bush 205 is arranged inside the conical portion 245, in the passage 243, so as to be able to translate relative to the body 204 parallel to the axis X204, along the conical portion 245. The bush is movable between a forward position, called "axial stop position," shown in FIG. 8, and an intermediate position, called "axial clamping position," shown in FIG. 9, and a rear position, called "axial withdrawn position.".

The bush 205 contains housings 251, which are distributed about the axis X204. Here, sixteen housings 251 are for example provided. Each clamping pad 206 is received within one of the housings 251, so as to be guided in radial translation in this housing 251. As a result, the pads 206 and the bush 205 are secured in translation relative to the body 204, along the axis X204. Each pad 206 has a heel 261, radially inserted between the conical portion 245 and the bush 205, to be kept captured by the bush 205, even in the uncoupled configuration. Unlike the heel 61, the heel 261 is arranged radially outside the bush 205. The centripetal translation of the pad 206 relative to the bush 205 is bounded in an inner radial position of the pad 206, called "radial stop position," where the pad 206 abuts against the bush 205 in the centripetal direction. In the uncoupled configuration, as shown in FIG. 8, the pads 206 are in the radial stop position.

The spring 208, which is a compression spring, is axially inserted between the bush 205 and the body 204, in particular the rear part 242. The spring 208 is coaxial with the axis X204 and constitutes an elastic return member, which applies an elastic return force on the bush 205, bearing on the body 204, this force being oriented along the forward direction X241, so as to return the bush 205 in the direction X241. More specifically, the spring 208 here is inserted between a rear axial shoulder, arranged at the rear end of the bush 205, and a front axial shoulder formed by the rear part 242 of the body 204. Thus, the spring 208 is positioned behind the bush 205.

Each pad 206 advantageously has a conical surface 262, complementary to the conical portion 245, by means of which the pad 206 cooperates mechanically with the portion 245, sliding along the conical portion 245. Unlike the conical surface 62, the surface 262 faces toward the outside along the axis X204. By mechanical cooperation between the conical surface 262 and the conical portion 245, the axial position of the bush 205 corresponds to a radial position of the pads 206 relative to the body 204. Under the action of the spring 208, the pads 206 are kept in contact with the conical portion 245 via the conical surface 262. Thus, the radial stop position of the pads 206 corresponds to the axial stop position of the bush 205.

Opposite the surface 262, each pad 206 advantageously has a cylindrical surface 263, to cooperate mechanically with the interface 233 of the terminal 203 in the coupled configuration. Unlike the surface 63, the surface 263 faces radially inward.

As shown in FIG. 9, in the coupled configuration, the pads 206 are in an inner radial position, called "radial clamping position," relative to the bush 205, to thus cooperate with the interface 233. This radial clamping position corresponds to the axial clamping position of the bush 205, owing to the angle return of the conical portion 245.

The ring 207 has a globally tubular shape, centered on the axis X204. Unlike the ring 7 and the ring 107, the ring 207 is arranged inside the passage 243. The ring 207 is translatable relative to the body 204 along the axis X204, between a forward position, called "idle position," shown in FIG. 8, and a rear position, called "unlocked position." The ring 207 also assumes an intermediate position, shown in FIG. 9, called "bearing position." The translational guiding of the ring 207 is advantageously obtained by sliding of the ring 207 in the rear part 242, inside the passage 243.

Optionally, rather than being made up of a single piece, the ring 207 comprises an outer part 290 and an inner part 291. The outer part 290 is tubular and centered on the axis X204. It is via the outer part 290 that the ring 207 slides relative to the body 204. It is understood that the ring 207 is in the idle position in that the part 290 is in a forward position, the ring 207 is in the bearing position in that the part 290 is in an intermediate position, and the ring 207 is in an unlocked position in that the part 290 is in a rear position.

The inner part 291 is tubular and coaxial with the outer part 290, and is mounted sliding inside the outer part 290 along the axis X204. In the coupled configuration, the inner part 291 is kept abutting against the outer part 290 in the direction X241, under the action of a spring 214, which is an axial compression spring, axially inserted between the inner part 291 and the rear part 242 of the body. The spring 214 therefore constitutes an elastic return member that exerts an elastic return force against the inner part 291, relative to the body 204, in the direction X241. In the uncoupled configuration, the inner part 291 is kept abutting against the body 204 by the spring 214, so as to close the inner passage 243 and thus to interrupt the circulation of the fluid through the passage 243, when the connector element 201 is in the uncoupled configuration. To this end, the inner part 291 constitutes a "valve" of the connector element 201. For example, to close the passage 243, the inner part 291 bears a seal 215 at its rear end, which bears against an inner flange 292, formed by the rear part 242 of the body 204. The inner part 291 then closes off a section of the passage 243, delimited by the inner flange 292, by means of the seal 215 inserted radially between the inner part 291 and the flange 292. Nevertheless, in the coupled configuration, the inner part 291 is kept in an intermediate position by the outer part 290 along the axis X204, relative to the body 204, such that the inner part 291 does not close off the section of the passage 243 delimited by the flange 292, thus allowing the circulation of the fluid.

The spring 209, which is a compression spring, is axially inserted between the ring 207 and the body 204. The spring 209 constitutes an elastic return member, to apply an elastic return force in the direction X241 on the ring 207 relative to the body 204, returning the ring 207 in the forward direction. Preferably, the spring 209 is inserted between the outer part 290 of the ring 207 and the flange 292 of the body 204. In practice, the spring 209 therefore returns the part 290 toward the idle position.

The ring 213 has a globally tubular shape, centered on the axis X204. The ring 213 is advantageously arranged around the body 204, in particular around the front part 241, so as to be able to be actuated by a user. The ring 213 is translatable relative to the body 204 along the axis X204, between a forward position, called "initial position," shown in FIG. 8, and an unlocked position. The ring 213 also assumes an intermediate position, shown in FIG. 9.

The ring 213 and the ring 207 are secured in translation along the axis X204, relative to the body 204. To do this, for example, the ring 213 is connected to the ring 207 by at least one tie rod 285. In practice, it is the part 290 and the ring 213 that are secured in translation, the tie rod 285 connecting the part 290 to the ring 213. Unlike the tie rod 185, the tie rod 285 is radial, and for example assumes the form of a screw. To connect the ring 213 and the ring 207, the tie rod 285 advantageously passes through an aperture 293 of the front part 241 of the body 204, and an aperture 294 of the bush 205. The apertures 293 and 294 are sufficiently elongated along the axis X204 to allow the axial movement of the tie rod 285 that passes through them, during the joint axial movement of the rings 213 and 207 relative to the body 204 and/or the bush 205.

In the uncoupled configuration, as shown in FIG. 8, the ring 207 and the ring 213 are securely maintained in the forward position under the action of the spring 209, that is to say, in the idle position of the ring 207 and in the initial position of the ring 213. This maintenance is for example by axial abutment of the ring 207 against the rear part 242 of the body 204. Here, the part 290 of the ring 207 bears, at its rear end, an outer annulus, which abuts in the direction X241 against an inner rear axial shoulder formed by the part 242.

The ring 207 comprises a circumferential face 272, here formed by an outer circumferential face of the part 290, by means of which the ring 207 is in tight contact with an inner wall of the body 204, here of the part 241, delimiting the passage 243. The tight contact is procured by means of a seal 211 received in a groove arranged in the part 242. Here, it is the ring 207 that bears the seal 211, unlike the element 1, where the body 4 bears the seal 11. The contact interface between the seal 211 and the circumferential face 272 forms a coaxial circle with the axis X204, which has a sealing diameter D211.

The ring 207 also comprises a front face 274, here formed by the part 290, at its front end. The face 274 is designed to come into tight contact with the distal face 235 of the terminal 203, in the coupled configuration, under the action of the spring 209. In this way, the ring 207 constitutes a "bearing ring." The tight contact is procured by means of a seal 212 received in a front slot of the front face 274. The contact interface between the seal 212 and the terminal 203 forms a coaxial circle with the axis X204, which has a sealing diameter D212, which is smaller than the sealing diameter D211 formed by the seal 211. Preferably, the seal 212 has a diameter smaller than that of the seal 211. In the coupled configuration, the sealing diameter D212 being smaller than the sealing diameter D211, the pressure of the fluid received in the passage 243 results in a force applied on the ring 207 relative to the body 204, in the direction X241. This force reinforces the tightness between the ring 207 and the terminal 203. In the coupled configuration, the terminal 203 securely maintains the rings 213 and 207 in the intermediate position relative to the body 204, against the force supplied by the springs 209 and 214, by bearing of the front face 274 against the distal face 235 via the seal 212. In this intermediate position, the ring 207 is in the bearing position and the ring 213 is in the intermediate position.

In the uncoupled configuration, as shown in FIG. 8, while the ring 207 is in the idle position, the pads 206 are radially separated from the ring 207 and are therefore not radially maintained by the ring 207. On the contrary, the pads 206 are positioned in the radial stop position.

To couple the connector, the terminal 203 and the body 204 are placed by aligning the axes X203 and X204, while the distal end of the terminal 203 faces the front end of the connector element 201. The body 204 and the terminal 203 are then brought closer to one another. Before the terminal 203 and the element 201 come into contact, the element 201 is in the uncoupled configuration shown in FIG. 8.

As shown in FIG. 8, the pads 206 are in the radial stop position, not being maintained in the radial withdrawn position. In a first stage of the approach, the front face 274 of the bearing ring 207 comes into tight contact with the distal face 235 of the terminal 203, here via the seal 212. Continuing the approach, the pads 206 come into contact with a distal edge of the passage 231, which causes their axial movement in the direction X242 relative to the body 204. The pads 206 drive the bush 205 with them in the same axial movement, against the spring 208. The pads 206 and the bush 205 move axially to the axial clamping position, and the pads 206 move radially to the radial clamping position, as shown in FIG. 9, by cooperation with the conical portion 245. In this radial clamping position, the pads 206 radially free a passage between them of size equal to or slightly larger than the interface 233, such that the pads 206 and the bush 205 stop at the clamping position, being axially retained by the force generated by the spring 208. The interface 233 radially penetrates between the pads 206. The coupled configuration shown in FIG. 9 is reached.

To uncouple the connector element 201, the body 204 is pushed back toward the terminal 203 along the axis X204 in order to reduce the radial force applied by the pads 206 on the interface 233 and thus to defuse their jamming. Simultaneously or successively, the ring 213, and therefore the ring 207, are moved toward the unlocked position, against the force of the spring 209. During the axial movement of the ring 207 in the direction X242, the ring 207 drives the bush 205 in the direction X242, relative to the body 204. To do this, for example, the part 290 has a flange 273, which is radially outer, and which abuts against a front axial shoulder of the bush 205, in the direction X242. Preferably, the flange 273 also forms the front face 274. When the ring 207 and the ring 213 reach the unlocked position, the bush 205 is in the axial withdrawn position, which has placed the pads 206 in the radial withdrawn position, which frees the terminal 203. The ring 213 can therefore be described as a "maneuvering ring." In fact, the assembly constituted by the two rings 207 and 203 makes it possible to ensure the bearing ring and maneuvering ring functions.

Once the connector element 201 and the terminal 203 have been released from one another, it is possible to release the assembly constituted by the ring 207 and the ring 213, which return to the forward position, where the ring 207 is in the idle position and the ring 213 is in the initial position under the action of the spring 209. Releasing the ring 207 allows the spring 208 to return the bush 205 to the axial stop position. The return of the ring 207 to the idle position is allowed owing to the fact that the flange 273 is small enough to be able to penetrate radially between the pads 206, when the pads 206 are in the radial stop position.

Figure 10:
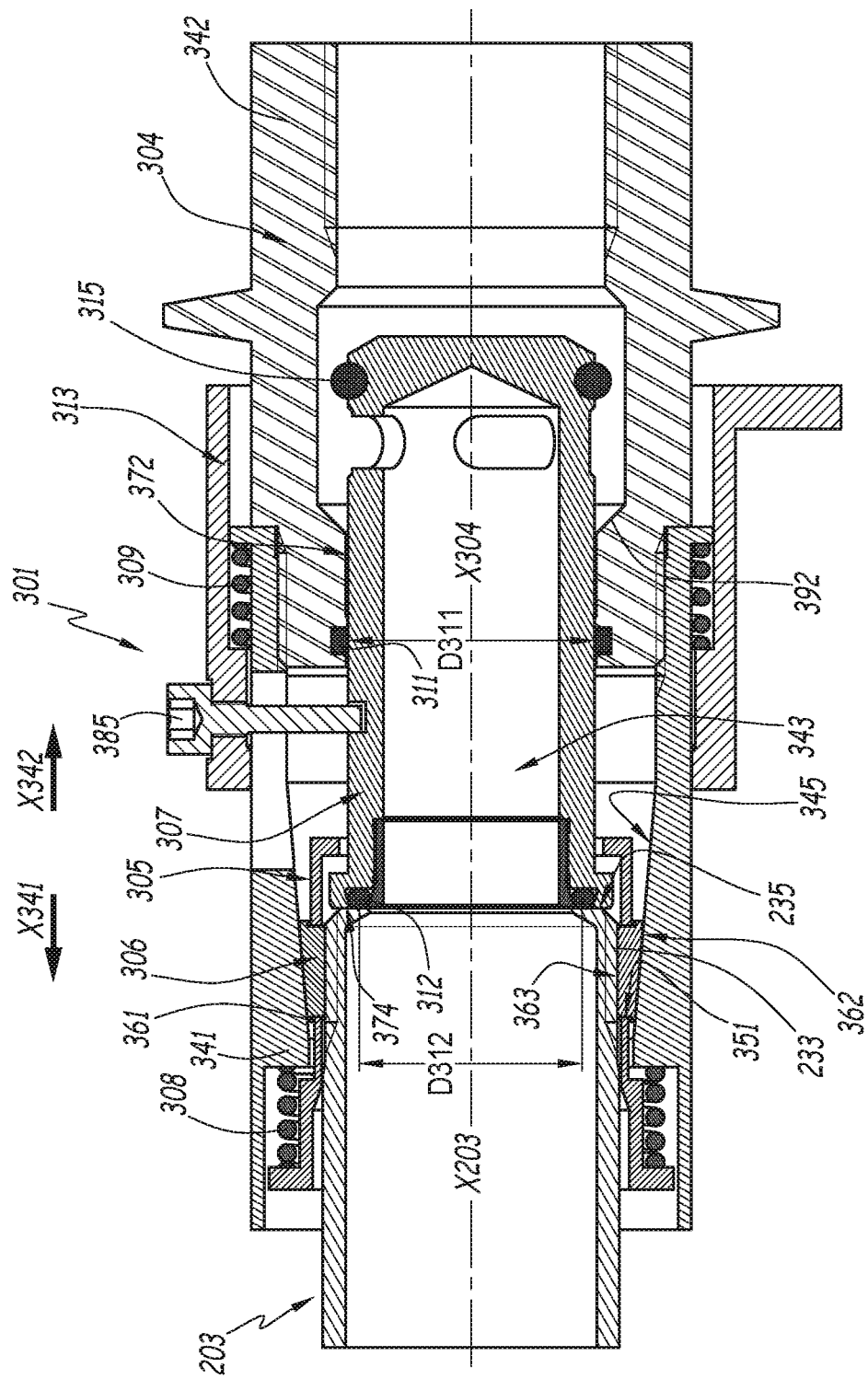
FIG. 10 is a longitudinal sectional view of a connector element, according to a fourth embodiment according to the invention, shown coupled with a terminal.

FIG. 10 shows a connector element 301 according to a fourth embodiment. This connector element 301 includes features in common with the connector elements 1, 101 and 201, which are identified with the same reference sign increased by 300 with respect to the reference signs for the connector element 1. The features described in the preceding for the connector elements 1, 101 and 201 apply to the connector element 301, aside from the differences described hereinafter. Hereinafter, some features that are identical, or based on the same principles, between the element 1, 101 and 201 and the element 301 are not explained again, and reference should be made to the preceding description.

In FIG. 10, the element 301 is shown in the coupled configuration. The element 301 is designed for a quick connect coupling with the terminal 203, visible in FIG. 10.

The connector element 301 comprises a body 304, a bush 305, clamping pads 306, a ring 307, a spring 308, a spring 309, a seal 311, a seal 312, a ring 313 and a seal 315, which operate in the same manner and have the same function as the body 204, the bush 205, the clamping pads 206, the ring 207, the spring 208, the spring 209, the seal 211, the seal 212, the ring 213 and the seal 215, except for the differences outlined hereinafter.

In particular, the body 304 comprises a front part 341 with a conical portion 345, and a rear part 342, respectively corresponding to the front part 241, the conical portion 245 and the rear part 242. The body 304 defines an inner passage 343 that corresponds to the passage 243. An axis X304, a direction X341 and a direction X342 of the connector element 301 respectively correspond to the axis X204, the direction X241 and the direction X242. The body 304 comprises a rear axial shoulder 392 that corresponds to the flange 292. The pads 306 comprise surfaces 362 and 363 and a heel 361 corresponding to the surfaces 262 and 263 and to the heel 261. The bush 305 comprises housings 351 corresponding to the housings 251. The ring 313 and the ring 307 are secured in axial translation via a tie rod 385, corresponding to the tie rod 285. The ring 307 has a front face 374, corresponding to the front face 274, and a circumferential face 372, corresponding to the circumferential face 272.

The spring 308 differs from the spring 208 by being inserted between a rear axial shoulder, arranged at the front end of the bush 305, and a front axial shoulder formed by the front part 341 of the body 304. The spring 308 is therefore located in front of the bush 305, while the spring 208 is behind the bush 205. This allows the radial bulk to be reduced to the detriment of the axial bulk of the element 301 relative to the element 201.

The spring 309 differs from the spring 209 by being inserted between the ring 313 and the body 304, while the spring 209 is inserted between the ring 207 and the body 304. In particular, the spring 309 is inserted between the ring 313 and the rear part 342.

The ring 307 differs from the ring 207 in that the ring 307 is formed by a single secured part, while the ring 207 comprises two parts 290 and 291, sliding relative to one another. The ring 307 is movable between the idle, bearing and unlocked positions, securely with the ring 313, which is movable between the corresponding initial, intermediate and unlocked positions. The spring 214 is absent from the element 301, the ring 307 only being subject to the action of the spring 309, by means of the ring 313. The ring 307 comprises a circumferential face 372, by means of which the ring 307 is in tight contact with an inner wall of the body 304, here of the part 342. The tight contact is procured by means of a seal 311 received in a groove arranged in the part 342. The contact interface between the seal 311 and the circumferential face 372 forms a coaxial circle with the axis X304, which has a sealing diameter D311.

The ring 307 also comprises a front face 374 at its front end. The face 374 is designed to come into tight contact with the distal face 235 of the terminal 203, in the coupled configuration, under the action of the spring 309. In this way, the ring 307 constitutes a "bearing ring." The tight contact is procured by means of a seal 312 received in a front slot of the front face 374. The contact interface between the seal 312 and the terminal 203 forms a coaxial circle with the axis X304, which has a sealing diameter D312, which is smaller than the sealing diameter D311 formed by the seal 311. Preferably, the seal 312 has a diameter smaller than that of the seal 311. In the coupled configuration, the sealing diameter D312 being smaller than the sealing diameter D311, the pressure of the fluid received in the passage 343 results in a force applied on the ring 307 relative to the body 304, in the direction X341. This force reinforces the tightness between the ring 307 and the terminal 203. The ring 307 simultaneously bears the seals 311, 312 and 315, to ensure both the bearing ring function provided by the part 290, and the valve function provided by the part 291.

The coupling and the uncoupling of the connector element 301 are done in the same way as those of the connector element 201.

Figure 11:
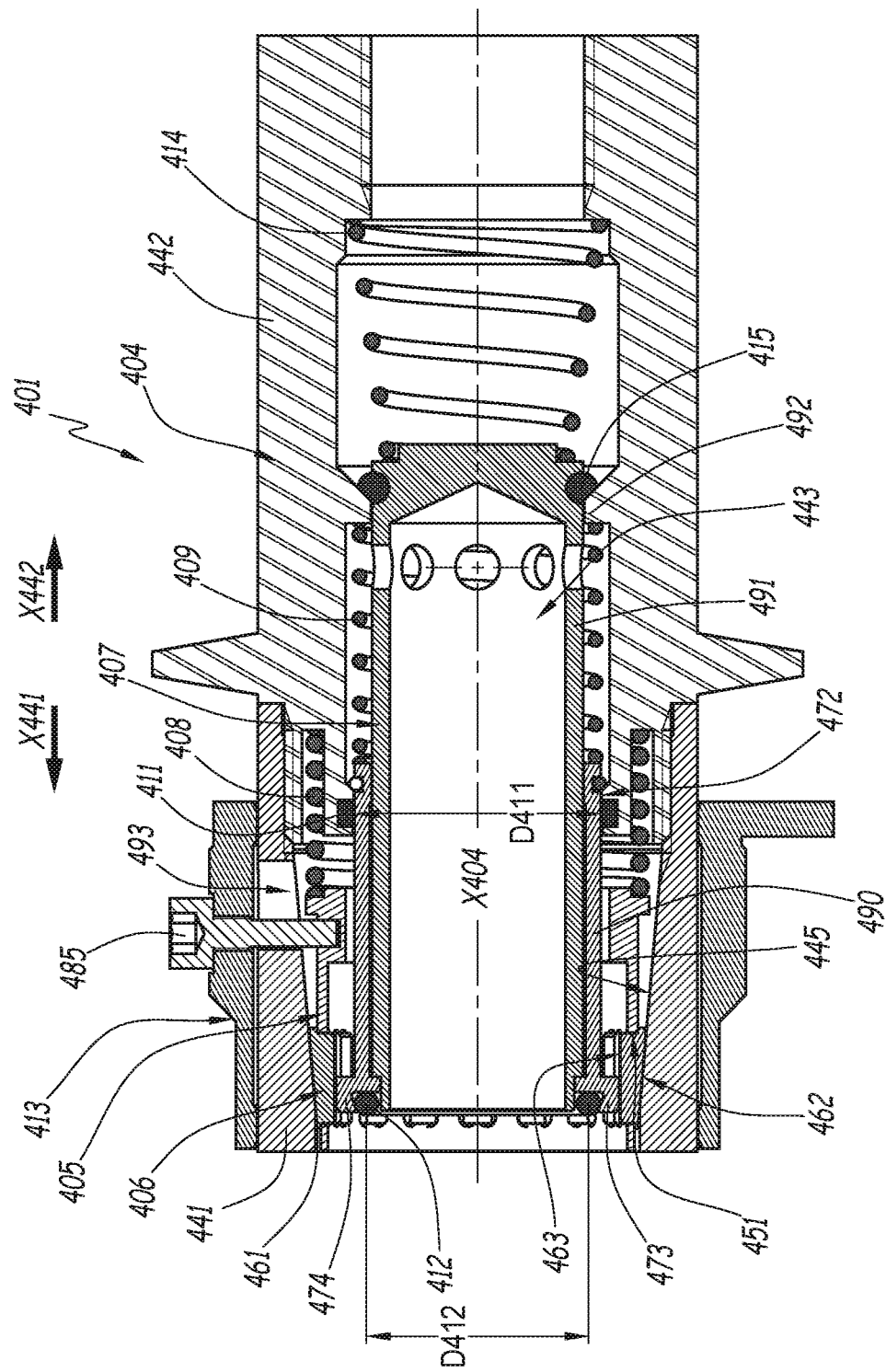
FIG. 11 is a longitudinal sectional view of a connector element, according to a fifth embodiment according to the invention.
Figure 12:
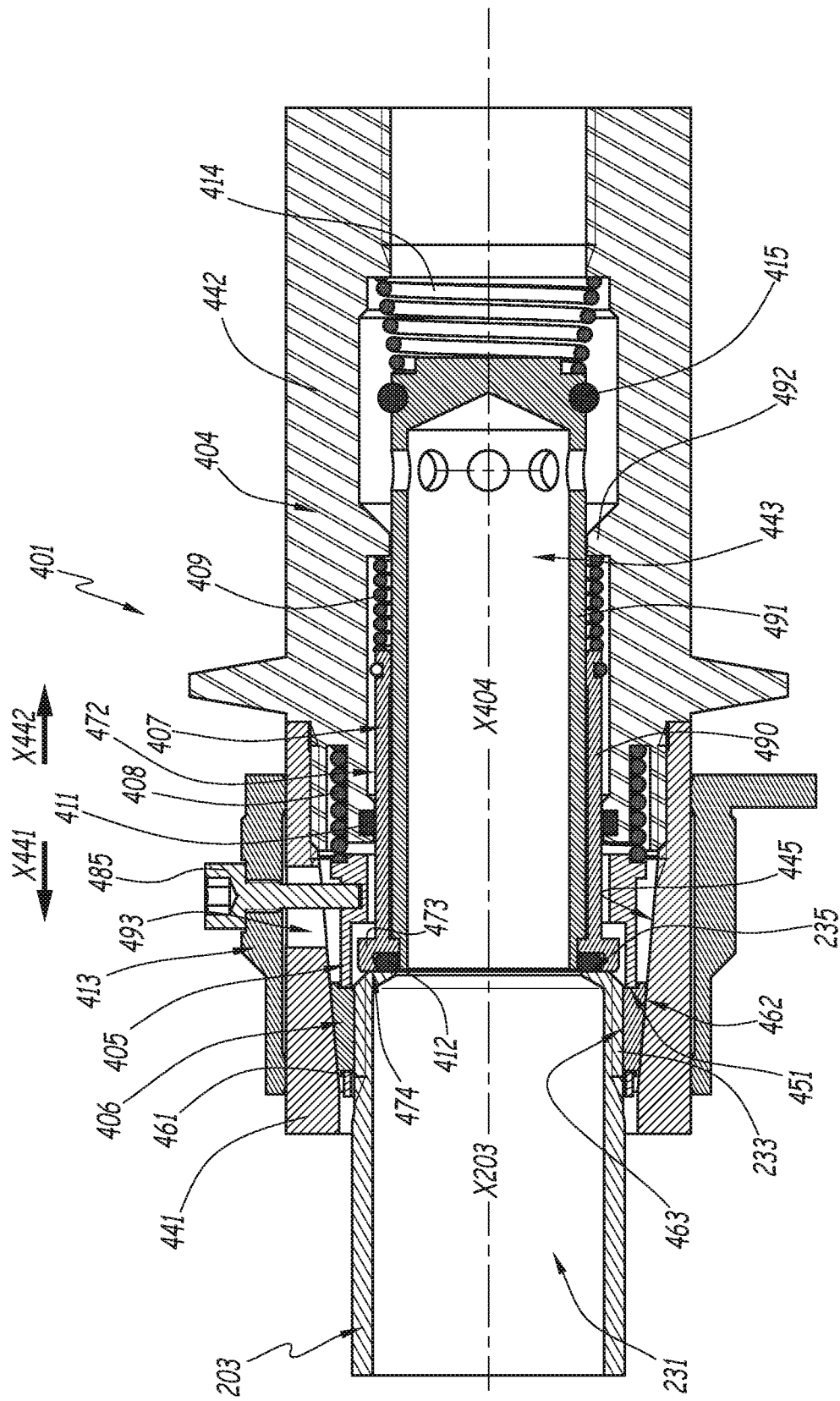
FIG. 12 is a sectional view similar to that of FIG. 11, where the connector element is coupled with a terminal.

FIGS. 11 and 12 show a connector element 401 according to a fifth embodiment. This connector element 401 includes features in common with the connector elements 1, 101, 201 and 301, which are identified with the same reference sign increased by 400 with respect to the reference signs for the connector element 1. The features described in the preceding for the connector elements 1, 101, 201 and 301 apply to the connector element 401, aside from the differences described hereinafter. Hereinafter, some features that are identical, or based on the same principles, between the element 1, 101, 201 and 301 and the element 401 are not explained again, and reference should be made to the preceding description.

In FIG. 11, the element 401 is shown in the uncoupled configuration. In FIG. 12, the element 401 is shown in the coupled configuration with the terminal 203.

The connector element 401 comprises a body 404, a bush 405, clamping pads 406, a ring 407, a spring 408, a spring 409, a seal 411, a seal 412, a ring 413 a spring 414 and a seal 415, which operate in the same manner and have the same function as the body 204, the bush 205, the clamping pads 206, the ring 207, the spring 208, the spring 209, the seal 211, the seal 212, the ring 213, the spring 214 and the seal 215, except for the differences described hereinafter.

In particular, the body 404 comprises a front part 441 with a conical portion 445, and a rear part 442, corresponding to the front part 241, the conical portion 245 and the rear part 242. The body 404 defines an inner passage 443 that corresponds to the passage 243. An axis X404, a direction X441 and a direction X442 of the connector element 401 respectively correspond to the axis X204, the direction X241 and the direction X242. The body 404 comprises a flange 492 that corresponds to the flange 292. The pads 406 comprise surfaces 462 and 463 and a heel 461 corresponding to the surfaces 262 and 263 and to the heel 261. The bush 405 comprises housings 451 corresponding to the housings 451. The ring 407 has a part 490, a part 491, a front face 474 and a circumferential face 472, which respectively correspond to the part 290, the part 291, the face 274 and the face 272. The springs 408, 409 and 414 are arranged like the springs 208, 209 and 214.

The element 401 differs from the element 301 in that the ring 413 is secured in axial translation with the bush 405, without being secured in translation with the ring 407, while the ring 213 is secured in axial translation with the ring 207 without being secured with the bush 205. To obtain solidarity in axial translation with the ring 413 and the bush 405, at least one tie rod 485 is for example provided. Like the tie rod 285, the tie rod 485 is radial, and for example assumes the form of a screw. To connect the ring 413 and the bush 405, the tie rod 485 advantageously passes through an aperture 493 of the front part 441 of the body 404. The aperture 493 is sufficiently elongated along the axis X404 to allow the axial movement of the tie rod 485 that passes through it, during the joint axial movement of the ring 413 and the bush 405 relative to the body 404.

The ring 413 and the bush 405 are jointly brought in the direction X441 by the spring 408, while the spring 409 does not act on the ring 413.

In the uncoupled configuration, by solidarity in translation, when the ring 413 is in the initial position as shown in FIG. 11, that is to say, a forward position, the bush 405 is in the axial stop position and therefore the pads 406 are in the radial stop position. When the ring 413 is in the intermediate position, the bush 405 is in the axial clamping position and the pads are in the radial clamping position, as shown in FIG. 12. When the ring 413 is in the unlocked position, that is to say, a rear position, the bush 405 is in the axial withdrawn position and the pads 406 are in the radial withdrawn position.

The ring 407 comprises a circumferential face 472, here formed by an outer circumferential face of the part 490, by means of which the ring 407 is in tight contact with an inner wall of the body 404, here of the part 442. The tight contact is procured by means of a seal 411 received in a groove arranged in the part 442. The contact interface between the seal 411 and the circumferential face 472 forms a coaxial circle with the axis X404, which has a sealing diameter D411.

The ring 407 also comprises a front face 474, here formed by the part 490, at its front end. The face 474 is designed to come into tight contact with the distal face 235 of the terminal 203, in the coupled configuration, under the action of the spring 409. In this way, the ring 407 constitutes a "bearing ring." The tight contact is procured by means of a seal 412 received in a front slot of the front face 474. The contact interface between the seal 412 and the terminal 203 forms a coaxial circle with the axis X404, which has a sealing diameter D412, which is smaller than the sealing diameter D411 formed by the seal 411. Preferably, the seal 412 has a diameter smaller than that of the seal 411. In the coupled configuration, the sealing diameter 412 being smaller than the sealing diameter D411, the pressure of the fluid received in the passage 443 results in a force applied on the ring 407 relative to the body 404, in the direction X441. This force reinforces the tightness between the ring 407 and the terminal 403.

The coupling of the connector element 401 is done in the same way as that of the connector element 201.

To uncouple the connector element 401, the body 404 is pushed back toward the terminal 203 along the axis X404 in order to reduce the radial force applied by the pads 406 on the interface 233 and thus to defuse their adherence. Simultaneously or successively, the ring 413 is moved in the direction X442 relative to the body, to the unlocked position. This movement jointly causes the movement of the bush 405 to the axial withdrawn position, and therefore of the pads to the radial withdrawn position, by cooperation with the conical portion 445. The action of the ring 413 therefore makes it possible to release the terminal 203 from the pads 406, for which reason the ring 413 can be qualified as a maneuvering ring. When the terminal 203 is removed, the spring 409 axially moves the ring 407 in the direction X441, to its idle position. In the idle position of the ring 407, the pads 406 are arranged radially at a distance from the ring 407, in the radial stop position.

In a variant, to obtain the radial bearing position of the pads 406, it is provided for the pads 406 to abut radially inwardly against a flange 473 of the bearing ring 407, corresponding to the flange 273. The presence of the heel 461 of the heel is then not mandatory. Also in a variant, it is even possible to provide for the flange 473 to have a bulk capable of keeping the pads 406 in their radial withdrawn position. Then, the operation of the obtained connector element corresponds to that of the connector element 101, where the clamping pads do not rub against the distal end of the terminal at the beginning of the coupling.

Figure 13:
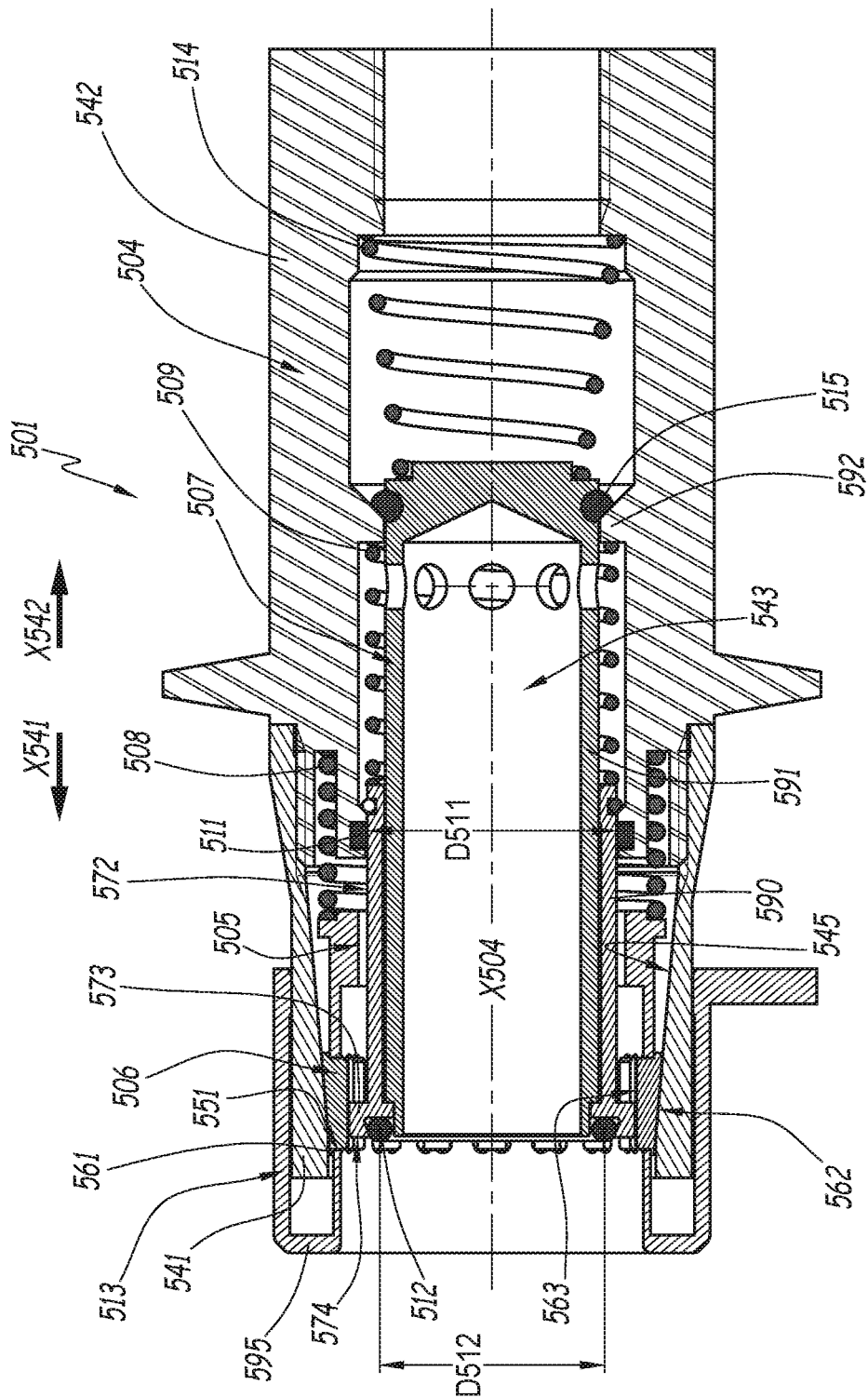
FIG. 13 is a longitudinal sectional view of a connector element, according to a sixth embodiment according to the invention.
Figure 14:
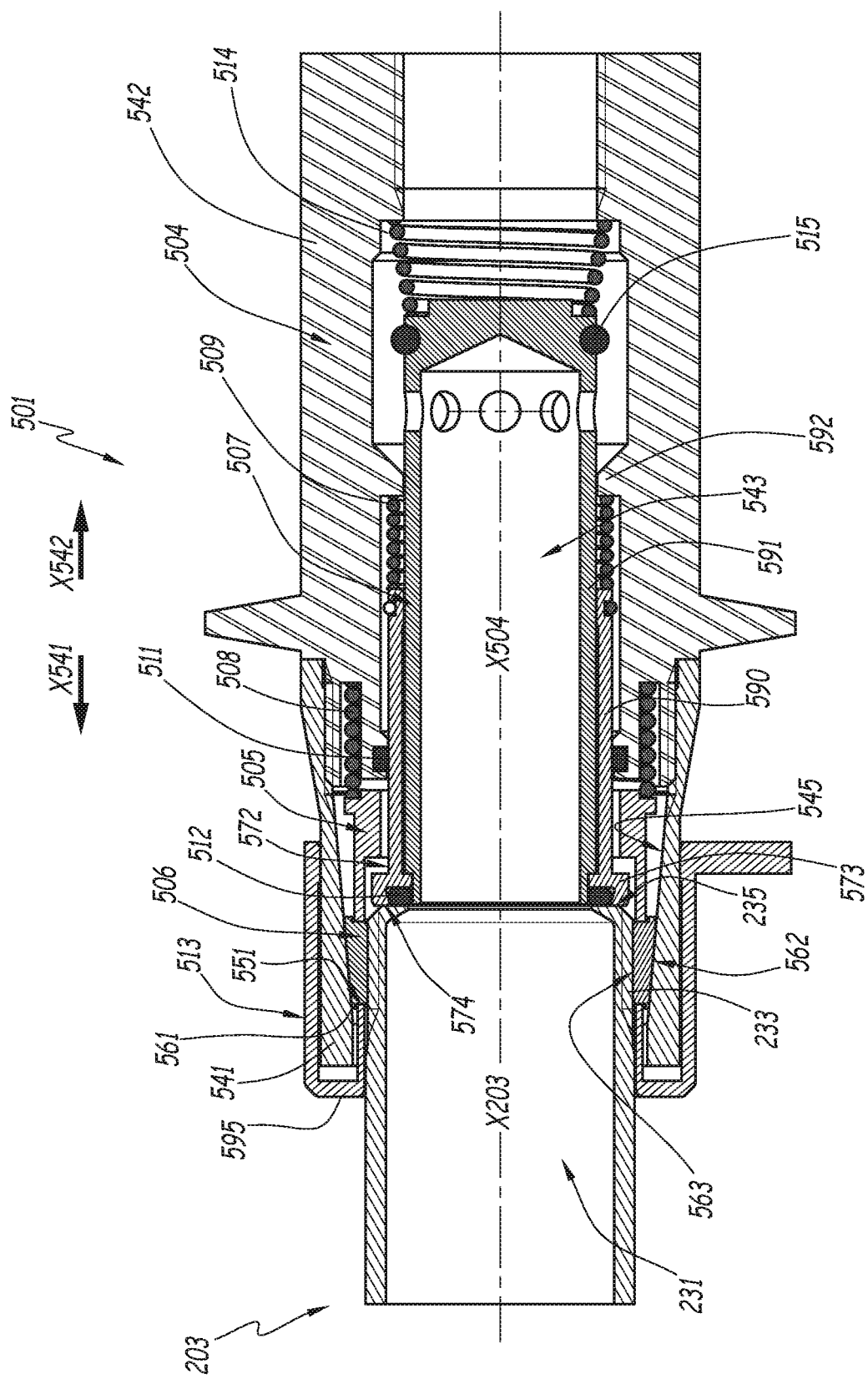
FIG. 14 is a sectional view similar to that of FIG. 13, where the connector element is coupled with a terminal.

FIGS. 13 and 14 show a connector element 501 according to a sixth embodiment. This connector element 501 includes features in common with the connector elements 1, 101, 201, 301 and 401, which are identified with the same reference sign increased by 500 with respect to the reference signs for the connector element 1. The features described in the preceding for the connector elements 1, 101, 201, 301 and 401 apply to the connector element 501, aside from the differences described hereinafter. Hereinafter, some features that are identical, or based on the same principles, between the element 1, 101, 201, 301 and 401 and the element 501 are not explained again, and reference should be made to the preceding description.

In FIG. 13, the element 501 is shown in the uncoupled configuration. In FIG. 14, the element 501 is shown in the coupled configuration with the terminal 203.

The connector element 501 comprises a body 504, a bush 505, clamping pads 506, a ring 507, a spring 508, a spring 509, a seal 511, a seal 512, a ring 513 a spring 514 and a seal 515, which operate in the same manner and have the same function as the body 404, the bush 405, the clamping pads 406, the ring 407, the spring 408, the spring 409, the seal 411, the seal 412, the ring 413, the spring 414 and the seal 415, except for the differences described hereinafter.

In particular, the body 504 comprises a front part 541 with a conical portion 545, and a rear part 542, respectively corresponding to the front part 441, the conical portion 445 and the rear part 442. The body 504 defines an inner passage 543 that corresponds to the passage 443. An axis X504, a direction X541 and a direction X542 of the connector element 501 respectively correspond to the axis X404, the direction X441 and the direction X442. The body 504 comprises a flange 592 that corresponds to the flange 492. The pads 506 comprise surfaces 562 and 563 and a heel 561 corresponding to the surfaces 462 and 463 and to the heel 461. The bush 505 comprises housings 551 corresponding to the housings 451. The ring 507 has a part 590, a part 591, a front face 574, a flange 573 and a circumferential face 572, which respectively correspond to the part 490, the part 491, the face 474, the flange 473 and the face 472. The springs 508, 509 and 514 are arranged like the springs 408, 409 and 414.

The element 501 differs from the element 401 in that the ring 513 and the bush 505 are formed in a single piece, to be secured in translation along the axis X504, rather than being connected by the tie rod 485. To thus be formed in a single piece, an annular portion 595 radially connects the ring 513 to the bush 505, preferably by passing the front end of the body 504. The tie rod 485 and/or the aperture 493 are advantageously not necessary for the element 501.

Irrespective of the embodiment, it is possible to provide that the connector element is configured to be coupled with a terminal having a smooth interface, that is to say, in particular not threaded.

Any feature belonging to one embodiment or variant as described above can be implemented in the other embodiments and variants described in the preceding, as long as it is technically admissible to do so.

The invention claimed is:

1. A connector element, for a quick connect coupling of a fluid pipe to a terminal, the terminal having an interface with a cylindrical enclosure, the connector element comprising:
   a body designed to be secured with the fluid pipe and delimiting an inner passage for the fluid, the inner passage extending along a fitting axis of the connector element, wherein the body comprises a conical portion, centered on the fitting axis, facing toward an inside and converging along a forward direction;
   a bush, which is translatable relative to the body along the fitting axis;
   a first elastic return member, which applies a first elastic return force on the bush, relative to the body, along the forward direction;
   clamping pads, each clamping pad being received in a respective opening belonging to the bush, the clamping pads being moved in translation radially relative to the bush, within their respective opening, by mechanical cooperation of the clamping pads with the conical portion, between:
  a radial withdrawn position of the clamping pads, so that the clamping pads are remote from the interface of the terminal, and
  a radial clamping position of the clamping pads, so that the clamping pads cooperate mechanically with the interface of the terminal;
a bearing ring, which is translatable relative to the body along the fitting axis and which comprises:
  a circumferential face, by means of which the bearing ring is in fluid-tight radial contact with the body, and
  a front face perpendicular to the fitting axis; and
a second elastic return member, which is formed by a spring and which applies a second elastic return force in the forward direction on the bearing ring, to place the bearing ring in fluid-tight contact with the terminal by means of the front face.

2. The connector element according to claim 1, wherein the conical portion defines a half aperture angle whose value is between 3 and 10 degrees.

3. The connector element according to claim 2, wherein the value of the half aperture angle is equal to 5 degrees.

4. The connector element according to claim 1, wherein each clamping pad has a cylindrical surface centered on the fitting axis, by means of which the clamping pad is designed to cooperate mechanically with the interface of the terminal when the clamping pad is in the radial clamping position.

5. The connector element according to claim 4, wherein each cylindrical surface has a thread or a surface treatment increasing its coefficient of friction.

6. The connector element according to claim 1, wherein a sealing diameter between the front face and the terminal is smaller than a sealing diameter between the circumferential face and the body.

7. The connector element according to claim 1, wherein the body and the bearing ring are designed to delimit, with the terminal, an inner volume, for an exchange of fluid between the inner volume and the inner passage.

8. The connector element according to claim 1, wherein the bearing ring closes the inner passage by means of a seal of the connector element when the connector element and the terminal are uncoupled.

9. The connector element according to claim 1, wherein the connector element further comprises a maneuvering ring, which is movable to an unlocked position, to release the terminal while the clamping pads were in the radial clamping position and were thus mechanically cooperating with the interface of the terminal.

10. The connector element according to claim 9, wherein the maneuvering ring and the bush are secured in translation relative to the body, along the fitting axis.

* * * * *